US 7,400,104 B2

(12) United States Patent
Sato

(10) Patent No.: US 7,400,104 B2
(45) Date of Patent: Jul. 15, 2008

(54) VOLTAGE CONVERTING DEVICE, COMPUTER READABLE RECORDING MEDIUM WITH PROGRAM RECORDED THEREON FOR CAUSING COMPUTER TO EXECUTE FAILURE PROCESSING, AND FAILURE PROCESSING METHOD

(75) Inventor: Eiji Sato, Nishikamo-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 447 days.

(21) Appl. No.: 10/537,262

(22) PCT Filed: Nov. 21, 2003

(86) PCT No.: PCT/JP03/14949

§ 371 (c)(1),
(2), (4) Date: Jun. 1, 2005

(87) PCT Pub. No.: WO2004/064235

PCT Pub. Date: Jul. 29, 2004

(65) Prior Publication Data

US 2006/0156096 A1    Jul. 13, 2006

(30) Foreign Application Priority Data

Jan. 10, 2003    (JP) .............................. 2003-004220

(51) Int. Cl.
*H02P 3/14* (2006.01)

(52) U.S. Cl. ...................... 318/376; 318/564; 318/700; 318/801; 361/23

(58) Field of Classification Search ................. 318/759, 318/732, 800, 801, 564, 139; 290/34; 701/22, 701/35; 361/23; 363/23, 132
See application file for complete search history.

(56) References Cited

U.S. PATENT DOCUMENTS

| 4,678,980 | A | * | 7/1987 | Sugimoto et al. | ........... 318/759 |
|---|---|---|---|---|---|
| 5,023,537 | A | * | 6/1991 | Baits | ........................ 318/732 |
| 5,373,195 | A | | 12/1994 | De Doncker et al. | |
| 5,414,339 | A | * | 5/1995 | Masaki et al. | ............... 318/800 |
| 5,552,681 | A | | 9/1996 | Suzuki et al. | |
| 6,420,793 | B1 | * | 7/2002 | Gale et al. | ..................... 290/34 |
| 6,757,598 | B2 | * | 6/2004 | Okoshi | ....................... 701/22 |
| 6,771,040 | B2 | * | 8/2004 | Kusumoto et al. | .......... 318/801 |
| 6,775,115 | B2 | * | 8/2004 | Sato | ............................ 361/23 |
| 6,917,179 | B2 | * | 7/2005 | Komatsu et al. | ............ 318/700 |
| 6,968,260 | B2 | * | 11/2005 | Okada et al. | ................... 701/35 |
| 6,978,213 | B2 | * | 12/2005 | Sato | ........................... 702/57 |
| 7,164,253 | B2 | * | 1/2007 | Sato et al. | ..................... 318/801 |
| 7,277,304 | B2 | * | 10/2007 | Stancu et al. | ................... 363/71 |
| 7,279,862 | B1 | * | 10/2007 | Welchko et al. | ............. 318/564 |

(Continued)

FOREIGN PATENT DOCUMENTS

EP    1 306 262 A2    5/2003

(Continued)

*Primary Examiner*—Paul Ip
(74) *Attorney, Agent, or Firm*—Oliff & Berridge, PLC

(57) ABSTRACT

A control device detects whether or not an up-converter fails, based on a DC voltage from a voltage sensor, an output voltage from a voltage sensor, and a duty ratio in controlling switching of NPN transistors. If a failure in the up-converter is detected, the control device then controls an inverter and an AC motor such that regenerative electric power generation in the AC motor is prohibited.

20 Claims, 13 Drawing Sheets

U.S. PATENT DOCUMENTS

| | | | |
|---|---|---|---|
| 2003/0030409 A1* | 2/2003 | Kusumoto et al. | 318/801 |
| 2003/0081440 A1* | 5/2003 | Komatsu et al. | 363/132 |
| 2003/0117823 A1* | 6/2003 | Sato | 363/132 |
| 2003/0130772 A1* | 7/2003 | Yanagida et al | 701/22 |
| 2004/0122563 A1* | 6/2004 | Okada et al. | 701/1 |
| 2004/0165868 A1 | 8/2004 | Sato et al. | |
| 2004/0228150 A1* | 11/2004 | Sato | 363/23 |
| 2005/0067999 A1 | 3/2005 | Okamura et al. | |
| 2006/0171175 A1* | 8/2006 | Zhu et al. | 363/21.12 |

FOREIGN PATENT DOCUMENTS

| | | |
|---|---|---|
| JP | A-02-308935 | 12/1990 |
| JP | A 5-260610 | 10/1993 |
| JP | A-06-261404 | 9/1994 |
| JP | A 2002-017004 | 1/2002 |

\* cited by examiner

VOLTAGE CONVERTING DEVICE, COMPUTER READABLE RECORDING MEDIUM WITH PROGRAM RECORDED THEREON FOR CAUSING COMPUTER TO EXECUTE FAILURE PROCESSING, AND FAILURE PROCESSING METHOD

TECHNICAL FIELD

The present invention relates to a voltage converting device capable of processing a failure in a voltage converter converting a DC voltage from a DC power supply to an output voltage, a computer readable recording medium with a program recorded thereon for causing a computer to execute failure processing, and a failure processing method.

BACKGROUND ART

Recently, hybrid vehicles and electric vehicles have attracted great attention as environment-friendly vehicles. Some hybrid vehicles are now commercially available.

The hybrid vehicle includes, as a power source, a DC power supply, an inverter and a motor driven by the inverter, in addition to the conventional engine. Specifically, the engine is driven to generate power while DC voltage from the DC power supply is converted into AC voltage by the inverter to rotate the motor by the AC voltage and accordingly generate power. The electric vehicle includes, as a power source, a DC power supply, an inverter and a motor driven by the inverter.

Some hybrid or electric vehicles are designed to boost DC voltage from the DC power supply by an up-converter and to supply the boosted DC voltage to the inverter driving the motor.

Japanese Patent Laying-Open No. 2-308935 discloses an electric device 300 shown in FIG. 13. This electric device 300 is mounted on a hybrid vehicle. Referring to FIG. 13, electric device 300 includes a DC power supply 310, a bypass line 311, a relay 312, a boost chopper 320, a capacitor 326, an inverter 330, an electric device body 350, and a field magnet controller 360.

Bypass line 311 and relay 312 are connected in series between a power supply line and the positive electrode of DC power supply 310.

Boost chopper 320 includes a reactor 321, MOS transistors 322, 323, and diodes 324, 325. Reactor 321 has one end connected to the power supply line of DC power supply 310 and the other end connected to the intermediate point between MOS transistor 322 and MOS transistor 323. MOS transistors 322 and 323 are connected in series between the power supply line and a ground line. MOS transistor 322 has its drain connected to the power supply line. MOS transistor 323 has its source connected to the ground line. Diodes 324, 325 are each connected between the source and drain of the corresponding one of MOS transistors 322, 323 for allowing current to flow from the source side to the drain side.

Inverter 330 is constituted of a U-phase arm 343, a V-phase arm 344 and a W-phase arm 345. U-phase arm 343, V-phase arm 344 and W-phase arm 345 are connected in parallel between the power supply line and the ground line.

U-phase arm 343 is formed of MOS transistors 331 and 332 connected in series. V-phase arm 344 is formed of MOS transistors 333 and 334 connected in series. W-phase arm 345 is formed of MOS transistors 335 and 336 connected in series. Diodes 337-342 are each connected between the source and drain of the corresponding one of MOS transistors 331-336 for allowing current to flow from the source side to the drain side.

Electric device body 350 includes three phase coils and serves as a power generator and a motor for an engine. The U, V, W phase arms of inverter 330 have their respective intermediate points connected to the respective ends of the U, V, W phase coils of electric device body 350. The other end of the U-phase coil is connected to the intermediate point between MOS transistors 331 and 332. The other end of the V-phase coil is connected to the intermediate point between MOS transistors 333 and 334. The other end of the W-phase coil is connected to the intermediate point between MOS transistors 335 and 336.

Field magnet controller 360 includes a diode 361, an NPN transistor 362 and a base amplifier 363. Diode 361 is connected between the positive terminal F+ of the field coil of electric device body 350 and the collector of NPN transistor 362. NPN transistor 362 is connected between the negative terminal F− of the field coil and the ground line for receiving at its base a voltage from base amplifier 363. Base amplifier 363 is responsive to a control signal from a control device (not shown) to output a prescribed voltage to the base of NPN transistor 362 for turning on/off NPN transistor 362.

DC power supply 310 outputs a DC voltage. When relay 312 is turned on by the control signal from the control device (not shown), bypass line 311 supplies the voltage on both ends of capacitor 326 to DC power supply 310. Boost chopper 320 has its MOS transistors 322, 323 turned on/off by the control device (not shown) and boosts the DC voltage supplied from DC power supply 310 to provide an output voltage to inverter 330. Boost chopper 320 also down-converts the DC voltage generated by electric device body 350 and converted by inverter 330 to charge DC power supply 310, at the time of regenerative braking of the hybrid vehicle including electric device 300.

Capacitor 326 smoothes the DC voltage supplied from boost chopper 320 and supplies the smoothed DC voltage to inverter 330.

Inverter 330 receives the DC voltage from capacitor 326 to convert the DC voltage to an AC voltage based on the control from the control device (not shown) and drives electric device body 350 as a driving motor. Field magnet controller 360 allows current to flow in the field coil in accordance with the time period during which NPN transistor 362 is turned on. Electric device body 350 is therefore driven as a driving motor to generate torque specified by a torque command value. In regenerative braking of the hybrid vehicle including electric device 300, inverter 330 also converts an AC voltage generated by electric device body 350 to a DC voltage based on the control from the control device and supplies the converted DC voltage to boost chopper 320 through capacitor 326.

In electric device 300, a failure in boost chopper 320 is detected by detecting that the output voltage of boost chopper 320 becomes lower than a reference value. When the failure in boost chopper 320 is detected, relay 312 is turned on by the control signal from the control device, and bypass line 311 directly supplies the voltage on both ends of capacitor 326 to DC power supply 310.

In electric device 300 disclosed in Japanese Patent Laying-Open No. 2-308935, however, when boost chopper 320 fails, the voltage on both ends of capacitor 326 is supplied to DC power supply 310 without being down-converted. Therefore, if a large amount of power is generated by electric device body 350, a high voltage will be applied to both ends of capacitor 326, resulting in that the withstand voltage performance of capacitor 326 must be improved, thereby increasing costs.

DISCLOSURE OF THE INVENTION

An object of the present invention is therefore to provide a voltage converting device capable of processing a failure in an up-converter without improving withstand voltage performance of a capacitor placed at an input of an inverter.

Another object of the present invention is to provide a failure processing method capable of processing a failure in an up-converter without improving withstand voltage performance of a capacitor placed at an input of an inverter.

A further object of the present invention is to provide a computer readable recording medium with a program recorded thereon for causing a computer to execute failure processing for an up-converter, without improving withstand voltage performance of a capacitor placed at an input of an inverter.

A voltage converting device in accordance with the present invention includes an electric load, a capacitor, a down-converter, and control means. The electric load has an electric power generating function. The capacitor is connected to an input of the electric load. The down-converter down-converts a voltage of the capacitor. The control means controls the electric load such that electric power generation in the electric load is prohibited or an amount of electric power generated by the electric load is decreased, when the down-converter fails.

Preferably, the down-converter has a voltage-up-converting function.

Preferably, the electric load is a motor having an electric power generating function. The control means restricts a regenerative electric power generating function of the motor, when the down-converter fails.

Preferably, the control means prohibits regenerative electric power generation of the motor.

Preferably, the voltage converting device further includes another electric load. Another electric load is different from the motor. The control means restricts an amount of regenerative electric power generated by the motor to a value smaller than power consumption in another electric load.

A voltage converting device in accordance with the present invention includes first and second electric loads, a capacitor, a down-converter, and control means. The first electric load has an electric power generating function. The capacitor is connected to an input of the first electric load. The down-converter down-converts a voltage of the capacitor. The second electric load is different from the first electric load. The control means controls the second electric load such that an amount of power consumption in the second electric load is increased, when the down-converter fails.

Preferably, the second electric load is a motor. The control means controls the motor such that it outputs positive torque.

In accordance with the present invention, a computer readable recording medium with a program recorded thereon for causing a computer to execute failure processing in a voltage converting device is provided. The voltage converting device includes an electric load having an electric power generating function, a capacitor connected to an input of the electric load, and a down-converter down-converting a voltage of the capacitor. The program causes the computer to execute a first step of detecting a failure in the down-converter, and a second step of controlling the electric load such that electric power generation in the electric load is prohibited or an amount of electric power generated by the electric load is decreased, when the failure in the down-converter is detected at the first step.

Preferably, the electric load is a motor having an electric power generating function. In the second step of the program, a regenerative electric power generating function of the motor is restricted.

Preferably, in the second step of the program, regenerative electric power generation of the motor is prohibited.

Preferably, the voltage converting device further includes another electric load different from the electric load. In the second step of the program, an amount of regenerative electric power generated by the motor is restricted to a value smaller than power consumption in another electric load.

In accordance with the present invention, a computer readable recording medium with a program recorded thereon for causing a computer to execute failure processing in a voltage converting device is provided. The voltage converting device includes a first electric load having an electric power generating function, a capacitor connected to an input of the electric load, a second electric load different from the first electric load, and a down-converter down-converting a voltage of the capacitor. The program causes the computer to execute a first step of detecting a failure in the down-converter and a second step of increasing an amount of power consumption in the second electric load, when the failure in the down-converter is detected at the first step.

Preferably, the second electric load is a motor. In the second step of the program, the motor is controlled such that it outputs positive torque, when the failure in the down-converter is detected at the first step.

In accordance with the present invention, a failure processing method in a voltage converting device including an electric load having an electric power generating function, a capacitor connected to an input of the electric load, and a down-converter down-converting a voltage of the capacitor includes: a first step of detecting a failure in the down-converter; and a second step of controlling the electric load such that electric power generation in the electric load is prohibited or an amount of electric power generated by the electric load is decreased, when the failure in the down-converter is detected at the first step.

Preferably, the electric load is a motor having an electric power generating function. In the second step, a regenerative electric power generating function of the motor is restricted.

Preferably, in the second step, regenerative electric power generation of the motor is prohibited.

Preferably, the voltage converting device further includes another electric load different from the electric load. In the second step of the failure processing method, an amount of regenerative electric power generated by the motor is restricted to a value smaller than power consumption in another electric load.

In accordance with the present invention, a failure processing method in a voltage converting device including a first electric load having an electric power generating function, a capacitor connected to an input of the electric load, a second electric load different from the first electric load, and a down-converter down-converting a voltage of the capacitor includes: a first step of detecting a failure in the down-converter; and a second step of increasing an amount of power consumption in the second electric load, when the failure in the down-converter is detected at the first step.

Preferably, the second electric load is a motor. In the second step of the failure processing method, the motor is controlled such that it outputs positive torque, when the failure in the down-converter is detected at the first step.

In the present invention, when an up-converter fails, electric power generation in an electric load connected to an output of the up-converter is prohibited or a power generation amount in the electric load is restricted. Furthermore, when the up-converter fails, a power generation amount in one of two electric loads is controlled to be equal to or less than energy consumption in the other electric load.

Therefore, in accordance with the present invention, even if the up-converter fails, it is possible to prevent a voltage equal to or higher than a withstand voltage from being applied to a capacitor connected to an input of an electric load (including first and second electric loads).

The foregoing and other objects, features, aspects and advantages of the present invention will become more apparent from the following detailed description of the present invention when taken in conjunction with the accompanying drawings.

BEST MODES FOR CARRYING OUT THE INVENTION

Figure 1:
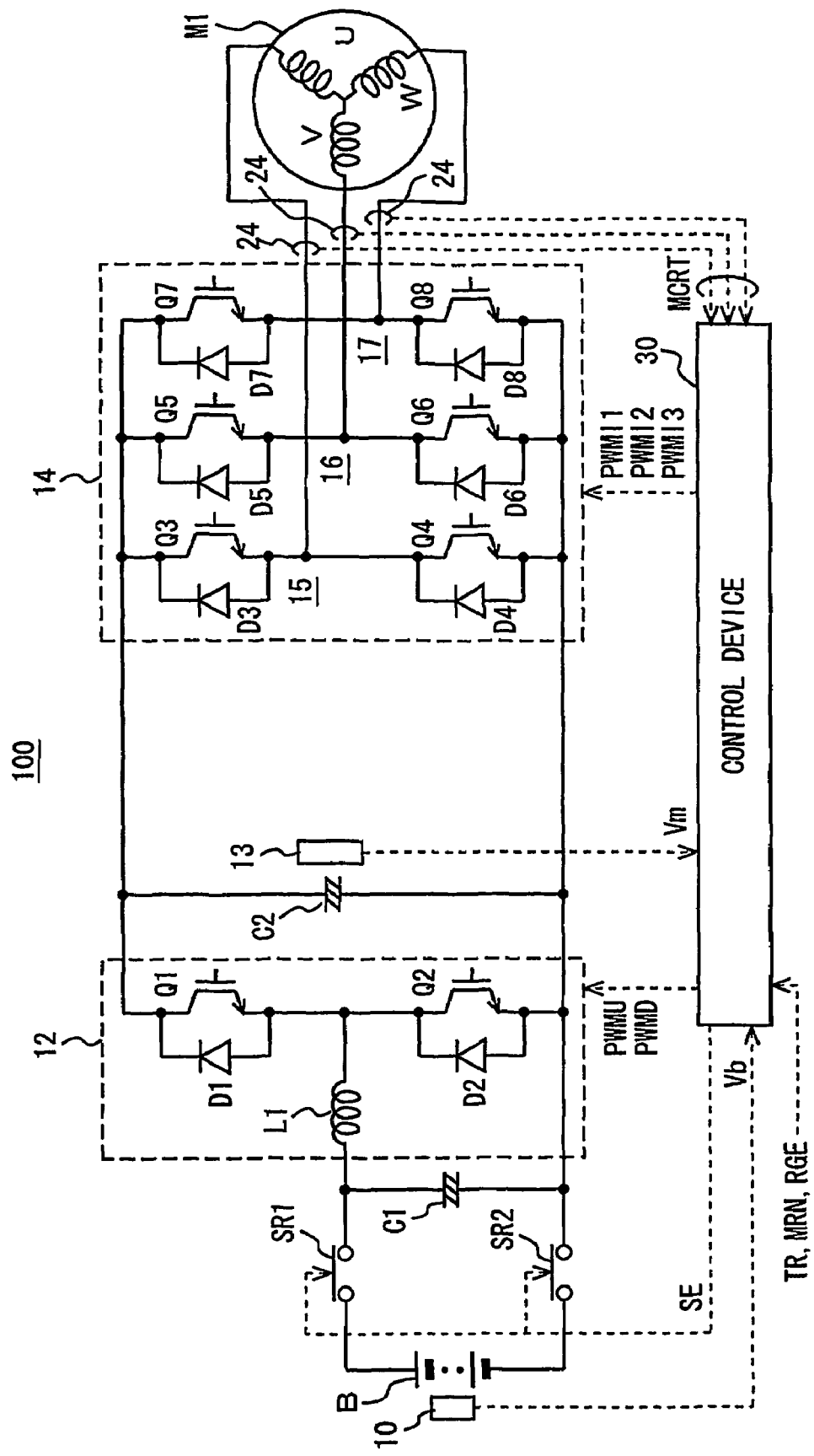
FIG. 1 is a schematic block diagram of a voltage converting device in accordance with a first embodiment.

Embodiments of the present invention will be described in detail with reference to the drawings. It is noted that in the figures the same or corresponding parts will be denoted with the same reference characters and description thereof will not be repeated.

First Embodiment

Referring to FIG. 1, a voltage converting device 100 in accordance with a first embodiment of the present invention includes a DC power supply B, voltage sensors 10, 13, system relays SR1, SR2, capacitors C1, C2, an up-converter 12, an inverter 14, a current sensor 24, a control device 30, and an AC motor M1. AC motor M1 is a drive motor for generating torque for driving a driving wheel of a hybrid or electric vehicle. Alternatively, the motor may serve as a power generator driven by the engine and as an electric motor for the engine. For example, it may be incorporated in a hybrid vehicle to start the engine.

Up-converter 12 includes a reactor L1, NPN transistors Q1, Q2, and diodes D1, D2. Reactor L1 has one end connected to a power supply line of DC power supply B and the other end connected to the intermediate point between NPN transistors Q1 and Q2, that is, between the emitter of NPN transistor Q1 and the collector of NPN transistor Q2. NPN transistors Q1 and Q2 are connected in series between the power supply line and a ground line. The collector of NPN transistor Q1 is connected to the power supply line, and the emitter of NPN transistor Q2 is connected to the ground line. Diodes D1, D2 are each arranged between the collector and emitter of the corresponding one of NPN transistors Q1, Q2 for allowing current to flow the emitter side to the collector side.

Inverter 14 is constituted of a U-phase arm 15, a V-phase arm 16 and a W-phase arm 17. U-phase arm 15, V-phase arm 16 and W-phase arm 17 are connected in parallel between the power supply line and the ground line.

U-phase arm 15 is formed of NPN transistors Q3 and Q4 connected in series. V-phase arm 16 is formed of NPN transistors Q5 and Q6 connected in series. W-phase arm 17 is formed of NPN transistors Q7 and Q8 connected in series. Diodes D3-D8 are each connected between the collector and emitter of the corresponding one of NPN transistors Q3-Q8 for allowing current to flow from the emitter side to the collector side.

The U, V, W phase arms have their respective intermediate points connected to the respective ends of the U, V, W phase coils of AC motor M1. Specifically, AC motor M1 is a three-phase permanent magnet motor with respective three coils of U, V and W phases each having one end connected commonly to the center. The other end of the U-phase coil is connected to the intermediate point between NPN transistors Q3 and Q4, the other end of the V-phase coil is connected to the intermediate point between NPN transistors Q5 and Q6, and the other end of the W-phase coil is connected to the intermediate point between NPN transistors Q7 and Q8.

DC power supply B is formed of a nickel-hydrogen or lithium-ion secondary battery. Voltage sensor 10 detects a DC voltage Vb from DC power supply B to output the detected DC voltage Vb to control device 30. System relays SR1, SR2 are turned on/off by a signal SE from control device 30. More specifically, system relays SR1, SR2 are turned on by signal SE of H (logical high) level from control device 30 and turned off by signal SE of L (logical low) level from control device 30.

Capacitor C1 smoothes DC voltage Vb supplied from DC power supply B to provide the smoothed DC voltage to up-converter 12.

Up-converter 12 boosts the DC voltage from capacitor C1 to supply the boosted voltage to inverter 14. More specifically, up-converter 12 receives a signal PWMU from control device 30 to boost the DC voltage and supply the boosted DC voltage to inverter 14 in accordance with a period in which NPN transistor Q2 is turned on by signal PWMU. In this case, NPN transistor Q1 is kept off by signal PWMU. Further, up-converter 12 receives a signal PWMD from control device 30 to down-convert the DC voltage supplied from inverter 14 via capacitor C2 and accordingly charge DC power supply B.

Capacitor C2 smoothes the DC voltage from up-converter 12 to supply the smoothed DC voltage to inverter 14. Voltage sensor 13 detects the voltage on both ends of capacitor C2, i.e., an output voltage Vm of up-converter 12 (which corresponds to an input voltage to inverter 14) and outputs the detected output voltage Vm to control device 30.

Inverter 14 receives the DC voltage from capacitor C2 to convert, based on a signal PWMI1 from control device 30, the DC voltage into an AC voltage and accordingly drive AC motor M1 to generate positive torque. Inverter 14 also converts, based on a signal PWMI2 from control device 30, the DC voltage to an AC voltage and drives AC motor M1 to output zero torque. Then, AC motor M1 is driven to generate zero or positive torque as designated by a torque command value TR.

In regenerative braking of a hybrid or electric vehicle including voltage converting device 100, inverter 14 converts an AC voltage generated by AC motor M1 into a DC voltage according to a signal PWMI3 from control device 30 and supplies the converted DC voltage to up-converter 12 via capacitor C2. Here, "regenerative braking" includes braking which is caused when a driver of a hybrid or electric vehicle manages the foot brake and which is accompanied by regenerative power generation as well as deceleration (or stopping of acceleration) of the vehicle by releasing the accelerator (pedal) in driving without managing the foot brake, which is also accompanied by regenerative power generation.

Current sensor 24 detects a motor current MCRT flowing to AC motor M1 to output the detected motor current MCRT to control device 30.

Control device 30 generates, based on torque command value TR and motor rotation number MRN supplied from an externally placed ECU (electrical control unit), DC voltage Vb from voltage sensor 10, output voltage Vm from voltage sensor 13, and motor current MCRT from current sensor 24, signal PWMU for driving up-converter 12 and signals PWMI1 and PVMI2 for driving inverter 14, following a method as described hereinbelow, and provides the generated signals PWMU and PWMI1, 2 to up-converter 12 and inverter 14 respectively.

Signal PWMU is a signal for driving up-converter 12 when up-converter 12 converts the DC voltage from capacitor C1 to output voltage Vm. When up-converter 12 converts the DC voltage to output voltage Vm, control device 30 controls the feedback of output voltage Vm and generates signal PWMU for driving up-converter 12 so that output voltage Vm becomes a voltage command Vdc_com as instructed. A method of generating signal PWMU will be described later.

Control device 30 receives from the external ECU a signal RGE indicating that the hybrid or electric vehicle enters a regenerative braking mode, to generate signal PWMI3 for converting the AC voltage generated by AC motor M1 into a DC voltage and output the signal to inverter 14. In this case, switching of NPN transistors Q3-Q8 of inverter 14 is controlled by signal PWMI3. In this way, inverter 14 converts the AC voltage generated by motor M1 into the DC voltage to supply the DC voltage to up-converter 12.

Furthermore, control device 30 receives from the external ECU signal RGE indicating that the hybrid or electric vehicle enters the regenerative braking mode, to generate signal PWMD for down-converting the DC voltage from inverter 14 and output the generated signal PWMD to up-converter 12. In this way, the AC voltage generated by AC motor M1 is converted into DC voltage, which is down-converted to be supplied to DC power supply B.

Moreover, control device 30 determines whether or not up-converter 12 fails, based on a duty ratio in controlling the switching of NPN transistors Q1, Q2, DC voltage Vb from voltage sensor 10 and voltage Vm from voltage sensor 13. When it is determined that up-converter 12 fails, control device 30 receives signal RGE from external ECU to control inverter 14 such that regenerative electric power generation in AC motor M1 is prohibited. More specifically, when up-converter 12 fails, control device 30 generates and outputs to inverter 14 signal PWMI1 for driving AC motor M1 to output positive torque or signal PWMI2 for driving AC motor M1 to output zero torque in the regenerative braking mode.

Moreover, control device 30 generates signal SE for turning on/off system relays SR1, SR2 and supplies signal SE to system relays SR1, SR2.

Figure 2:
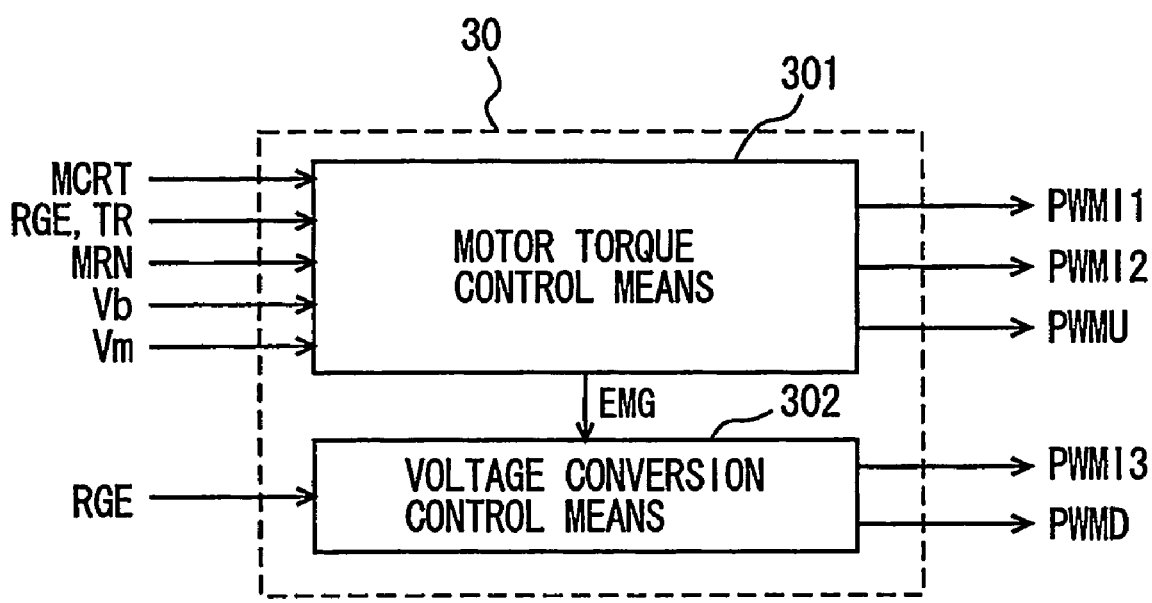
FIG. 2 is a functional block diagram of a control device shown in FIG. 1.

FIG. 2 is a functional block diagram of control device 30. Referring to FIG. 2, control device 30 includes motor torque control means 301 and voltage conversion control means 302. Motor torque control means 301 generates, based on torque command value TR, output voltage Vb of DC power supply B, motor current MCRT, motor rotation number MRN, and output voltage Vm of up-converter 12, signal PWMU for turning on/off NPN transistors Q1, Q2 of up-converter 12 and signal PVMI1 for turning on/off NPN transistors Q3-Q8 of inverter 14, following a method described hereinafter, and outputs the generated signals PWMU and PWMI1 to up-converter 12 and inverter 14, respectively, when AC motor M1 is driven to output positive torque.

Motor torque control means 301 determines whether or not up-converter 12 fails based on a duty ratio in controlling the switching of NPN transistors Q1, Q2 and voltages Vb, Vm. When it is determined that up-converter 12 fails, motor torque control means 301 generates a signal EMG in response to signal RGE from external ECU to output signal EMG to voltage conversion control means 302, and also generates signal PWMI1 for driving AC motor M1 to output positive torque or signal PWMI2 for driving the AC motor to output zero torque, to output signal PVMI1 or PWMI2 to inverter 14.

In regenerative braking, voltage conversion control means 302 receives from external ECU signal RGE indicating that the hybrid or electric vehicle enters the regenerative braking mode, to generate signal PVWMI3 for converting the AC voltage generated by AC motor M1 to a DC voltage and output signal PWMI3 to inverter 14.

In regenerative braking, voltage conversion control means 302 also receives signal RGE from external ECU to generate signal PWMD for down-converting the DC voltage supplied from inverter 14 and output signal PWMD to up-converter 12. In this way, up-converter 12 serves as a bidirectional converter as it can also down-convert the voltage by signal PWMD for down-converting a DC voltage.

Furthermore, voltage conversion control means 302 receives signal EMG from motor torque control means 301 to stop generation of signals PWMI3 and PWMD.

Figure 3:
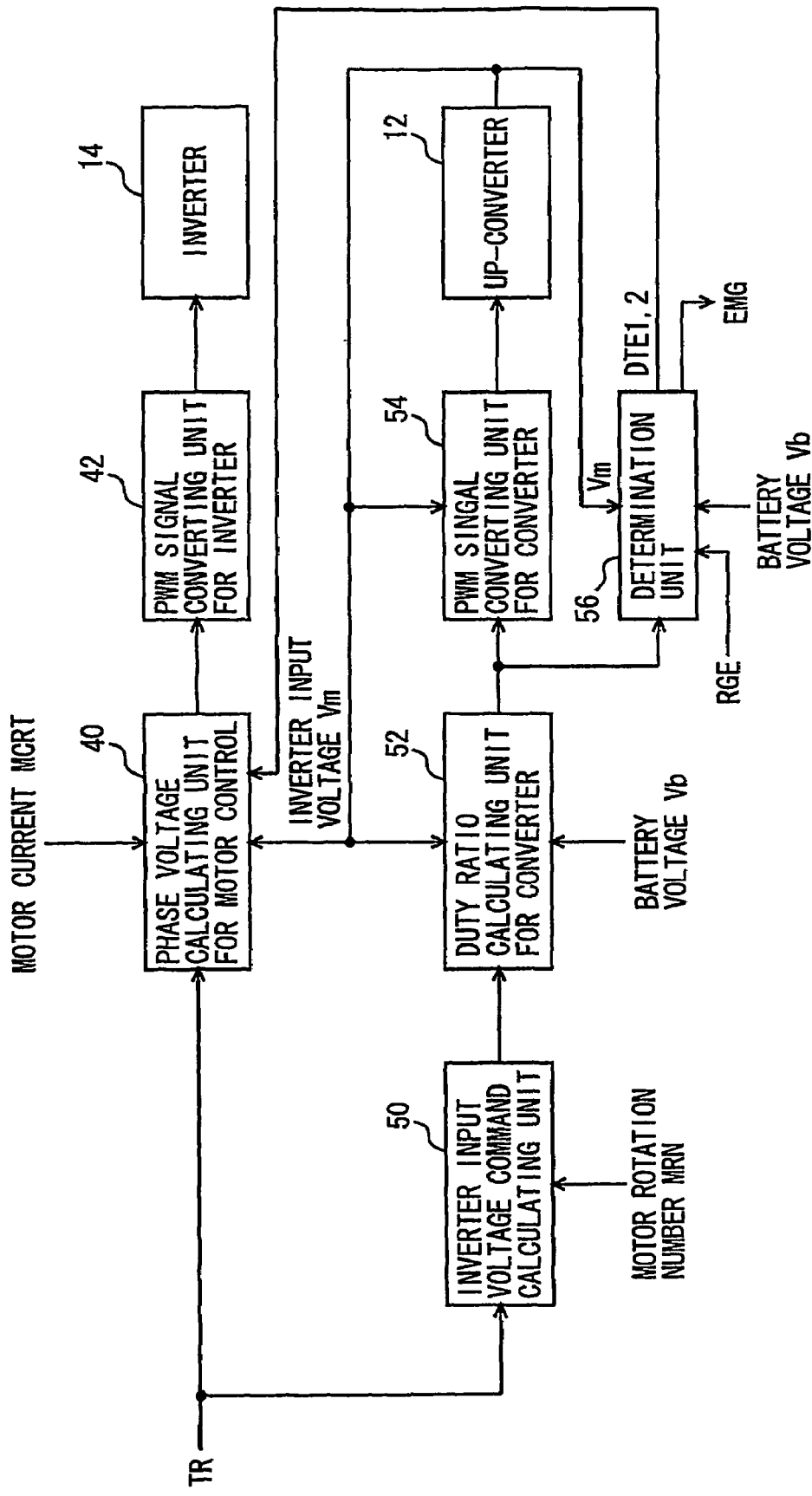
FIG. 3 is a functional block diagram illustrating a function of motor torque control means shown in FIG. 2.

FIG. 3 is a functional block diagram of motor torque control means 301. Referring to FIG. 3, motor torque control means 301 includes a phase voltage calculating unit 40 for controlling the motor, a PWM signal converting unit 42 for the inverter, an inverter input voltage command calculating unit 50, a duty ratio calculating unit 52 for the converter, a PWM signal converting unit 54 for the converter, and a determination unit 56.

Phase voltage calculating unit 40 receives from voltage sensor 13 output voltage Vm of up-converter 12, that is, the input voltage to inverter 14, receives from current sensor 24 motor current MCRT flowing to each phase of AC motor M1, receives torque command value TR from the external ECU, and receives signals DTE 1, 2 from determination unit 56. When receiving signal DTE1 from determination unit 56, phase voltage calculating unit 40 calculates, based on torque command value TR, output voltage Vm and motor current MCRT, a voltage to be applied to the coil of each phase of AC motor M1 and supplies the calculated voltage to PWM signal converting unit 42.

Phase voltage calculating unit 40 receives signal DTE2 from determination unit 56 to calculate a voltage to be applied to the coil of each phase of AC motor M1 for allowing AC motor M1 to output zero or positive torque, and then supply the calculated voltage to PWM signal converting unit 42.

PWM signal converting unit 42 generates, based on the calculated voltage supplied from phase voltage calculating unit 40, signals PWMI1, PWMI2 for actually turning on/off each of NPN transistors Q3-Q8 of inverter 14 and supplies the generated signals PWMI1, PWMI2 to each of NPN transistors Q3-Q8 of inverter 14.

Switching of NPN transistors Q3-Q8 each is thus controlled and NPN transistors Q3-Q8 accordingly control the current to be supplied to each phase of AC motor M1 so that AC motor M1 generates zero or positive torque. In this way, the motor drive current is controlled so that the motor torque is output according to torque command value TR.

On the other hand, inverter input voltage command calculating unit 50 calculates an optimum value (target value) of an inverter input voltage, that is, voltage command Vdc_com, based on torque command value TR and motor rotation number MRN, and provides the calculated voltage command Vdc_com to duty ratio calculating unit 52.

Duty ratio calculating unit 52 calculates, based on DC voltage Vb output from voltage sensor 10 (also referred to as "battery voltage Vb"), a duty ratio for setting voltage Vm from voltage sensor 13 at the optimum value supplied from inverter input voltage command calculating unit 50. Duty ratio calculating unit 52 outputs the calculated duty ratio to PWM signal converting unit 54 and determination unit 56.

PWM signal converting unit 54 generates, based on the duty ratio supplied from duty ratio calculating unit 52, signal PWMU for turning on/off NPN transistors Q1, Q2 of up-converter 12 and provides the generated signal PWMU to up-converter 12.

A greater amount of electric power is accumulated by reactor L1 by increasing on-duty of NPN transistor Q2 which is the lower transistor of up-converter 12, and accordingly a higher-voltage output is obtained. The voltage on the power supply line is decreased by increasing the on-duty of the upper transistor, i.e., NPN transistor Q1. The duty ratio of NPN transistors Q1 and Q2 can thus be controlled to control the voltage on the power supply line such that the voltage on the power supply line is an arbitrary voltage of at least the output voltage of DC power supply B.

Determination unit 56 receives battery voltage Vb from voltage sensor 10, voltage Vm from voltage sensor 13, duty ratio DR from duty ratio calculating unit 52, and signal RGE from external ECU. Determination unit 56 multiplies battery voltage Vb by duty ratio DR and determines whether or not a product AP resulting from the multiplication matches voltage Vm from voltage sensor 13. If the product AP matches voltage Vm, determination unit 56 determines that up-converter 12 operates normally, and generates and outputs signal DTE1 to phase voltage calculating unit 40. If product AP does not match voltage Vm, determination unit 56 determines that up-converter 12 fails, and receives signal RGE from external ECU to generate and output signals EMG and DTE2 to voltage conversion control means 302 and phase voltage calculating unit 40, respectively.

Figure 4:
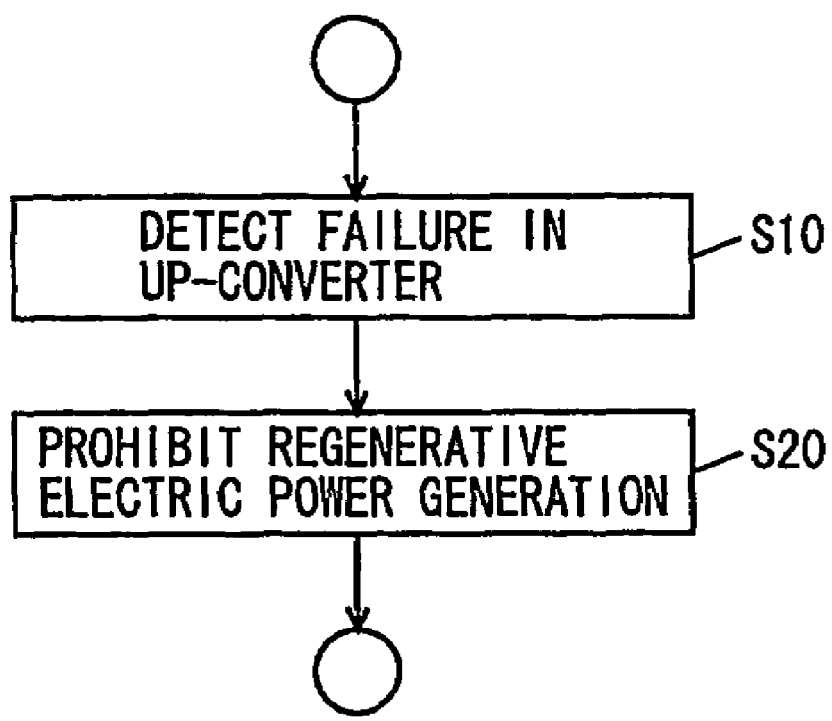
FIG. 4 is a flowchart illustrating an operation of processing a failure in an up-converter in the first embodiment.

FIG. 4 is a flowchart illustrating an operation of processing a failure in up-converter 12 in the first embodiment. Referring to FIG. 4, upon the start of a series of operations, determination unit 56 detects a failure in up-converter 12, following the aforementioned method, based on battery voltage Vb from voltage sensor 10, voltage Vm from voltage sensor 13 and duty ratio DR from duty ratio calculating unit 52 (step S10).

When detecting a failure in up-converter 12 and receiving signal RGE from external ECU, determination unit 56 generates and outputs signals EMG and DTE2 to voltage conversion control means 302 and motor torque control means 301, respectively.

In response, voltage conversion control means 302 stops generation of signals PWMI3 and PWMD. In response to signal DTE2 from determination unit 56, phase voltage calculating unit 40 calculates a voltage to be applied to the coil of each phase in generating signal PWMI1 for driving AC motor M1 to output positive torque or signal PVMI2 for driving AC motor M1 to output zero torque, and outputs the calculated voltage to PWM signal converting unit 42.

PWM signal converting unit 42 generates signal PWMI1 or PWMI2 based on the calculated voltage from phase voltage calculating unit 40 to output PWMI1 or PWMI2 to inverter 14. Inverter 14 drives AC motor M1 to output zero or positive torque in response to signal PVVMI1 or PWMI2 from PWM signal converting unit 42, and regenerative electric power generation is prohibited (step S20). A series of operations then ends.

Therefore, even if control device 30 receives from external ECU signal RGE indicating regenerative power generation, in the event of a failure in up-converter 12, regenerative electric power generation in AC motor M1 is prohibited, thereby preventing DC voltage equal to or higher than the withstand voltage from being applied to capacitor C2.

Inverter 14 may be stopped to prohibit regenerative electric power generation in AC motor M1 in the event of a failure in up-converter 12. In the present embodiment, however, regenerative electric power generation is prohibited with AC motor M1 being kept driven so as to output the instructed torque immediately when external ECU torque supplies command value TR for outputting positive torque.

Returning to FIG. 1, the operation in voltage converting device 100 will be described. Control device 30 receives torque command value TR from external ECU to generate and output signal SE at H level to system relays SR1, SR2 for turning on system relays SR1, SR2. Control device 30 also generates signals PWMU and PWMI1 for controlling up-converter 12 and inverter 14 such that AC motor M1 generates torque command value TR and output signals PWMU and PWMI1 to up-converter 12 and inverter 14, respectively.

DC power supply B outputs DC voltage Vb, and system relays SR1, SR2 supply DC voltage Vb to capacitor C1. Capacitor C1 smoothes the received DC voltage Vb and supplies the smoothed DC voltage to up-converter 12.

Then, NPN transistors Q1, Q2 of up-converter 12 are turned on/off in response to signal PWMU from control device 30 and convert DC voltage Vb to output voltage Vm to be supplied to inverter 14. Voltage sensor 13 detects output voltage Vm that is a voltage on both ends of capacitor C2 and outputs the detected output voltage Vm to control device 30. Capacitor C2 smoothes output voltage Vm of up-converter 12 and supplies the smoothed output voltage Vm to inverter 14.

NPN transistors Q3-Q8 of inverter 14 are turned on/off in response to signal PWMI1 from control device 30. Inverter 14 converts the DC voltage to an AC voltage and allows prescribed AC current to flow to each of U, V and W phases of AC motor M1 so that AC motor M1 generates torque as designated by torque command value TR. In this way, AC motor M1 generates torque as designated by torque command value TR.

When the hybrid or electric vehicle including voltage converting device 100 enters the regenerative braking mode, control device 30 receives from external ECU signal RGE indicating the regenerative braking mode, to generate and output signals PWMI3 and PWMD to inverter 14 and up-converter 12, respectively.

AC motor M1 generates an AC voltage and supplies the generated AC voltage to inverter 14. Inverter 14 then converts the AC voltage to a DC voltage in accordance with signal PVWMI3 from control device 30 and supplies the converted DC voltage to up-converter 12 via capacitor C2.

Up-converter 12 down-converts the DC voltage in accordance with signal PWMD from control device 30 and supplies the down-converted DC voltage to DC power supply B to charge DC power supply B.

Then, control device 30 determines, following the aforementioned method, whether or not up-converter 12 fails, based on DC voltage Vb, voltage Vm and duty ratio DR for controlling the switching of NPN transistors Q1, Q2. If up-converter 12 fails, control device 30 controls inverter 14 such that regenerative electric power generation in AC motor M1 in the regenerative braking mode is prohibited.

In this manner, in voltage converting device 100, regenerative electric power generation in AC motor M1 in the regenerative braking mode is prohibited when up-converter 12 fails. This can prevent application of a voltage equal to or higher than the withstand voltage to capacitor C2.

The failure processing method in accordance with the present invention includes detecting a failure in up-converter 12 and prohibiting regenerative electric power generation according to the flowchart shown in FIG. 4.

The failure processing in motor torque control means 301 is actually controlled by a CPU (Central Processing Unit). CPU reads a program including the steps of the flowchart shown in FIG. 4 from an ROM (Read Only Memory) and executes the read program to control the failure processing for up-converter 12 according to the flowchart shown in FIG. 4. Thus, ROM corresponds to a computer (CPU) readable recording medium with a program recorded thereon with the steps of the flowchart in FIG. 4.

It is noted that AC motor M1 forms an "electric load".

Here, "prohibiting regenerative (electric power generation)" means driving AC motor M1 to output zero or positive torque.

In accordance with the first embodiment, the voltage converting device includes a control device that controls an inverter such that regenerative electric power generation in an AC motor is prohibited when an up-converter fails, thereby preventing application of a voltage equal to or higher than a withstand voltage to a capacitor provided at the input of the inverter.

Second Embodiment

Figure 5:
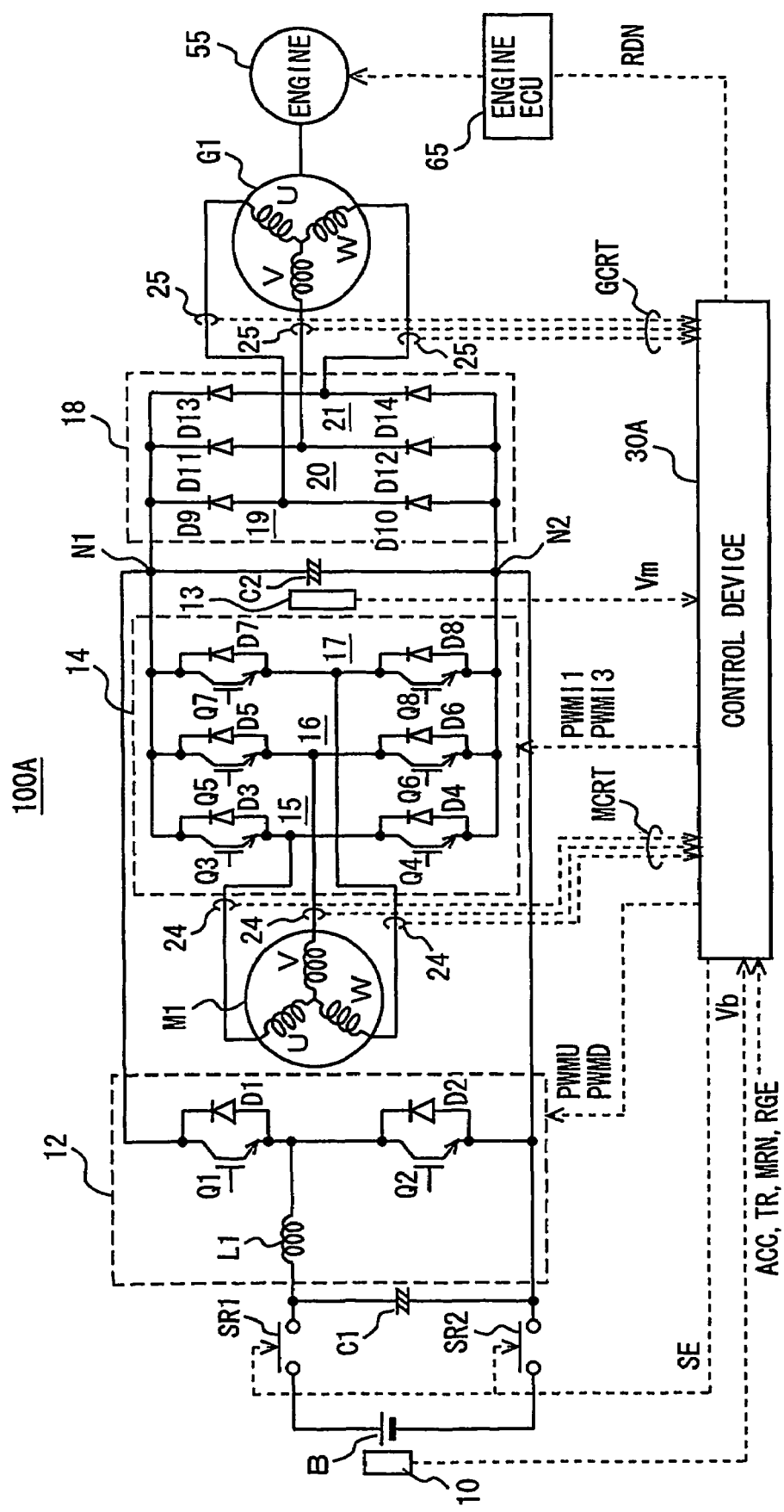
FIG. 5 is a schematic block diagram of a voltage converting device in accordance with a second embodiment.

Referring to FIG. 5, a voltage converting device 100A in accordance with a second embodiment is the same as voltage converting device 100 except that control device 30 in voltage converting device 100 is replaced with a control device 30A and that a rectifier 18, a generator G1 and a current sensor 25 are added.

Inverter 14 and rectifier 18 are connected in parallel between nodes N1 and N2 on both ends of capacitor C2. Generator G1 is connected to an engine 55.

Rectifier 18 is constituted of a U-phase arm 19, a V-phase arm 20 and a W-phase arm 21. U-phase arm 19, V-phase arm 20 and W-phase arm 21 are connected in parallel between the power supply line and the ground line. U-phase arm 19 is formed of diodes D9 and D1 connected in series. V-phase arm 20 is formed of diodes D11 and D12 connected in series. W-phase arm 21 is formed of diodes D13 and D14 connected in series. The intermediate point between diode D9 and diode D10 is connected to the end of U-phase coil of generator G1. The intermediate point between diodes D11 and diode D12 is connected to the end of the V-phase coil of generator G1. The intermediate point between diode D13 and diode D14 is connected to the end of the W-phase coil of generator G1.

Rectifier 18 rectifies the AC voltage generated by generator G1 and supplies the rectified DC voltage to up-converter 12 via capacitor C2. Generator G1 generates an AC voltage by rotation of a rotor, which is caused by rotating power of engine 55, and supplies the generated AC voltage to rectifier 18.

Current sensor 25 detects a generator current GCRT flowing to each phase of generator G1 and outputs the detected generator current GCRT to control device 30A.

Control device 30A generates signals PWMI1 and PWMI3, among signals PWMI1-3 for driving inverter 14, and outputs signals PVMI1 and PWMI3 to inverter 14. The method of generating signals PWMI1 and PWMI3 is the same as described in the first embodiment.

When control device 30A determines that up-converter 12 fails, following the aforementioned method, it calculates an energy consumption Pm in AC motor M1 based on an accelerator opening degree ACC and motor rotation number MRN from external ECU and calculates a power generation amount (the amount of generated electric power) Pg in generator G1 based on voltage Vm from voltage sensor 13 and generator current GCRT from current sensor 25. Control device 30A then generates and outputs signal RDN to an engine ECU 65 for setting the rotation number of engine 55 such that power generation amount Pg in generator G1 is equal to or less than energy consumption Pm in AC motor M1.

Control device 30A has the same function as control device 30 in the other respects.

Engine 55 is controlled by engine ECU 65 for outputting prescribed torque for driving a drive wheel as well as for transmitting a rotating power to generator G1. Engine ECU 65 controls engine 55. Engine ECU 65 receives signal RDN from control device 30A to hold or decrease the rotation number of engine 55.

Figure 6:
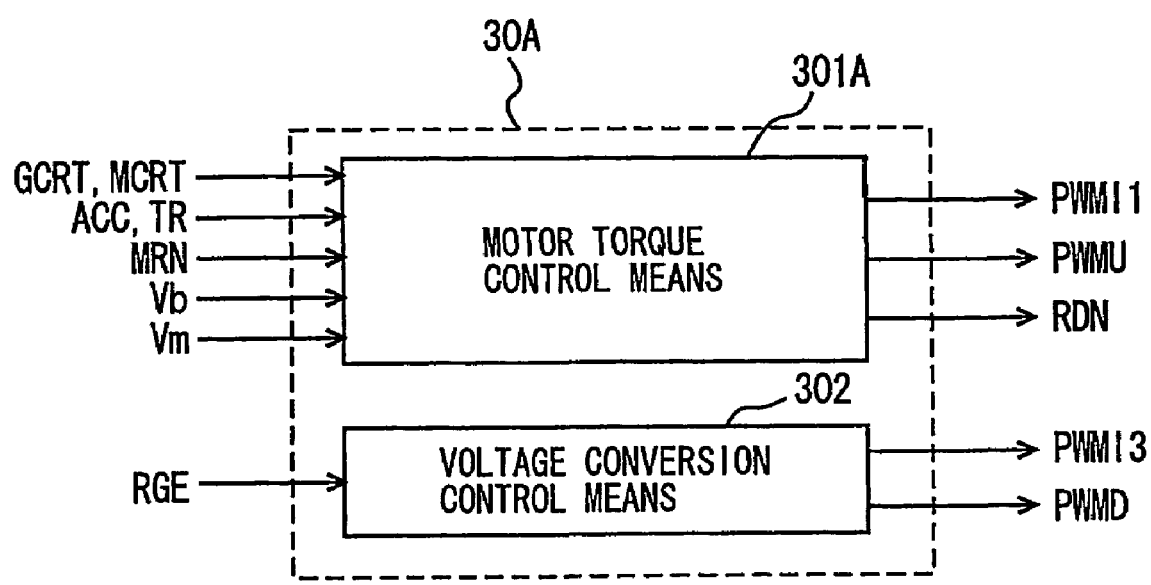
FIG. 6 is a functional block diagram of a control device shown in FIG. 5.

Referring to FIG. 6, control device 30A is the same as control device 30 except that motor torque control means 301 of control device 30 is replaced with motor torque control means 301A.

Motor torque control means 301A generates and outputs signals PWMU and PWMI1 to up-converter 12 and inverter 14, respectively, following the same method as in motor torque control means 301.

Furthermore, motor torque control means 301A determines whether or not up-converter 12 fails, following the same method as in motor torque control means 301. When motor torque control means 301A determines that up-converter 12 fails, it calculates energy consumption Pm in AC motor M1 based on accelerator opening degree ACC and motor rotation number MRN and calculates power generation amount Pg in generator G1 based on generator current GCRT and voltage Vm. Furthermore, motor torque control means 301A generates and outputs signal RDN to engine ECU 65 for setting the rotation number of engine 55 such that power generation amount Pg is equal to or less than energy consumption Pm.

Figure 7:
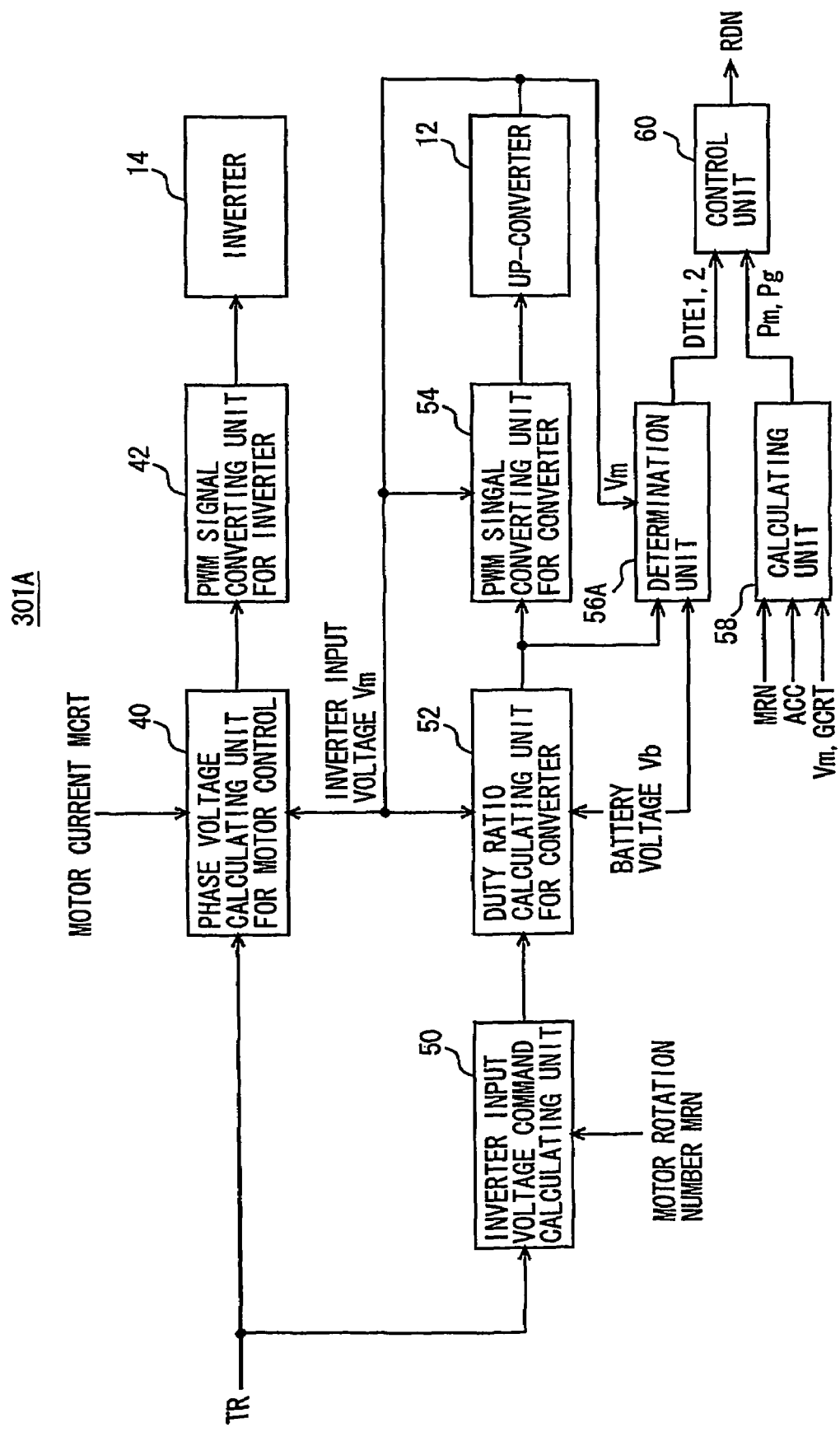
FIG. 7 is a functional block diagram illustrating a function of motor torque control means shown in FIG. 6.

Referring to FIG. 7, motor torque control means 301A is the same as motor torque control means 301 except that determination unit 56 of motor torque control means 301 is replaced with a determination unit 56A and that a calculating unit 58 and a control unit 60 are added.

Determination unit 56A determines whether or not up-converter 12 fails, following the same method as in determination unit 56. If it is determined that up-converter 12 is normal, determination unit 56A generates and outputs signal DTE1 to control unit 60. On the other hand, if it is determined that up-converter 12 fails, determination unit 56A generates and outputs signal DTE2 to control unit 60.

Calculating unit 58 calculates energy consumption Pm of AC motor Ml based on accelerator opening degree ACC and motor rotation number MRN from external ECU. Calculating unit 58 also calculates power generation amount Pg in generator G1 based on voltage Vm from voltage sensor 13 and generator current GCRT from current sensor 25. Calculating unit 58 then outputs the calculated energy consumption Pm and power generation amount Pg to control unit 60.

When control unit 60 receives signal DTE1 from determination unit 56A, it does not generate a control signal. When control unit 60 receives signal DTE2 from determination unit 56A, it generates and outputs signal RDN to engine ECU 65 for setting the rotation number of engine 55 such that power generation amount Pg is equal to or less than energy consumption Pm.

Figure 8:
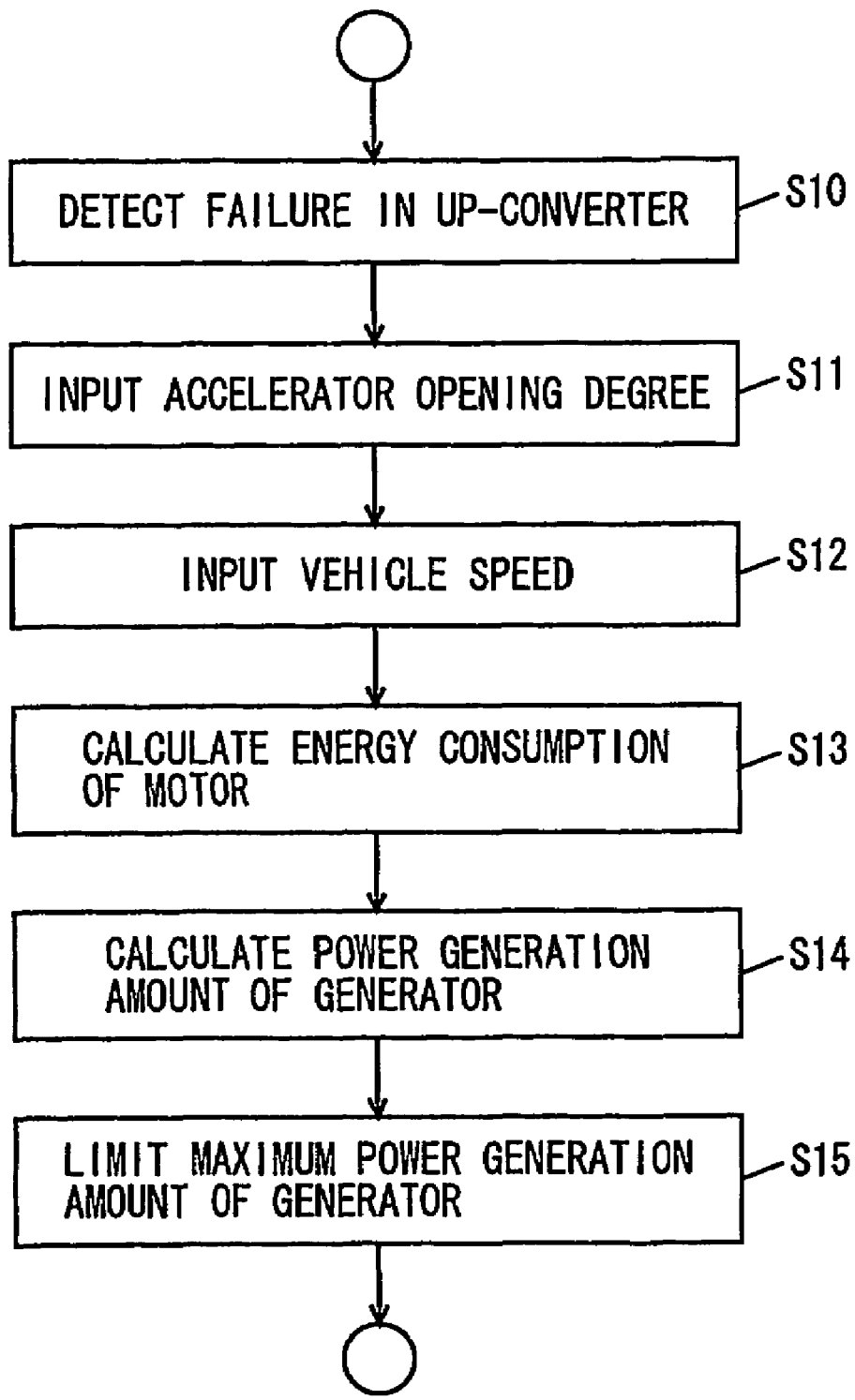
FIG. 8 is a flowchart illustrating an operation of processing a failure in an up-converter in the second embodiment.

FIG. 8 is a flowchart illustrating the operation of processing a failure in up-converter 12 in the second embodiment. Referring to FIG. 8, upon the start of a series of operations, determination unit 56A of control device 30A detects a failure in up-converter 12, based on battery voltage Vb from voltage sensor 10, voltage Vm from voltage sensor 13 and duty ratio DR from duty ratio calculating unit 52, and generates and outputs signal DTE2 to control unit 60 (step S10). Calculating unit 58 then receives accelerator opening degree ACC from external ECU (step S11) and receives a vehicle speed, i.e., motor rotation number MRN from external ECU (step S12).

Calculating unit 58 then calculates torque T from accelerator opening degree ACC based on that torque T output by AC motor M1 is proportional to accelerator opening degree ACC. Calculating unit 58 then calculates energy consumption Pm in AC motor M1 based on the calculated torque T and motor rotation number MRN from external ECU (step S13).

Calculating unit 58 also calculates power generation amount Pg in generator G1 based on voltage Vm from voltage sensor 13 and generator current GCRT from current sensor 25 (step S14). Calculating unit 58 then outputs the calculated energy consumption Pm and power generation amount Pg to control unit 60.

In response to signal DTE2 from determination unit 56A, control unit 60 generates and outputs to engine ECU 65 signal RDN for setting the rotation number of engine 55 such that power generation amount Pg is equal to or less than energy consumption Pm. In other words, control unit 60 controls generator G1 by setting an upper limit of power generation amount Pg in generator G1 such that power generation amount Pg does not exceed energy consumption Pm in AC motor M1.

More specifically, control unit 60 receives signal DTE2 from determination unit 56A to compare power generation amount Pg from calculating unit 58 with energy consumption Pm. When power generation amount Pg is equal to or less than energy consumption Pm, control unit 60 generates a signal RDN1 for holding the present rotation number of engine 55 and outputs signal RDN1 to engine ECU 65. When power generation amount Pg is greater than energy consumption Pm, control unit 60 generates a signal RDN2 for decreasing the present rotation number of engine 55 and outputs signal RDN2 to engine ECU 65. Signal RDN therefore includes signals RDN1 and RDN2.

Engine ECU 65 holds the rotation number in response to signal RDN1 from control unit 60 or controls engine 55 to decrease the rotation number in response to signal RDN2 from control unit 60. The rotation number of engine 55 is held at a certain value or decreased. Power generation amount Pg in generator G1 is thus decreased to energy consumption Pm or less (step S15).

The electric power generated by generator G1 is all consumed in AC motor M1, thereby preventing application of a voltage equal to or higher than a withstand voltage to both ends of capacitor C2.

Returning to FIG. 5, the operation in voltage converting device 100A will be described. The operations are as described in the first embodiment in that control device 30A generates signals PWMU and PWMI1 for driving up-converter 12 and inverter 14 to output the same to up-converter 12 and inverter 14, respectively, up-converter 12 up-converts DC voltage Vb to output voltage Vm, and inverter 14 drives AC motor M1.

Generator G1 generates electric power using the rotating power of engine 55 and supplies the generated AC voltage to rectifier 18. Rectifier 18 rectifies the AC voltage to supply DC voltage to capacitor C2. Current sensor 25 detects generator current GCRT and outputs the detected current to control device 30A.

Control device 30A determines whether or not up-converter 12 fails, following the aforementioned method. If up-converter 12 fails, control device 30A calculates energy consumption Pm of AC motor M1 and power generation amount Pg of generator G1. Then, control device 30A generates signal RDN for setting the rotation number of engine 55 such that power generation amount Pg is equal to or less than energy consumption Pm, and control device 30A outputs signal RDN to engine ECU 65. In response to signal RDN from control device 30A, engine ECU 65 holds or decreases the rotation number to rotate engine 55. Power generation amount Pg of generator G1 is thus controlled to be equal to or less than energy consumption Pm of AC motor M1.

When AC motor M1 enters the regenerative braking mode, control device 30A receives signal RGE from external ECU and generates and outputs signals PWMI3 and PWMD to inverter 14 and up-converter 12, respectively.

AC motor M1 generates an AC voltage and supplies the generated AC voltage to inverter 14. Inverter 14 then converts the AC voltage to a DC voltage in accordance with signal PWMI3 from control device 30A to supply the converted DC voltage to up-converter 12 via capacitor C2.

Up-converter 12 down-converts the DC voltage in accordance with signal PWMD from control device 30A to supply the down-converted DC voltage to DC power supply B to charge DC power supply B.

As described above, in -voltage converting device 100A, if up-converter 12 fails, power generation amount Pg in generator G1 is controlled to be equal to or less than energy consumption Pm in AC motor M1. Therefore, a voltage equal to or higher than a withstand voltage is prevented from being applied to capacitor C2.

The failure processing method in accordance with the present invention includes detecting a failure in up-converter 12 according to the flowchart shown in FIG. 8 and controlling power generation amount Pg in generator G1 to be equal to or less than energy consumption Pm in AC motor M1.

The failure processing in motor torque control means 301A is actually controlled by CPU. CPU reads a program including the steps in the flowchart shown in FIG. 8 from an ROM and executes the read program to control the failure processing for up-converter 12 according to the flowchart shown in FIG. 8. Therefore, ROM corresponds to a computer (CPU) readable recording medium with a program recorded thereon with the steps in the flowchart shown in FIG. 8.

The other details are the same as in the first embodiment.

In accordance with the second embodiment, the voltage converting device includes a control device that controls a power generation amount of a generator to be equal to or less than an energy consumption of an AC motor, in the event of a failure in an up-converter, thereby preventing application of a voltage equal to or higher than a withstand voltage to a capacitor provided at an input of an inverter.

Third Embodiment

Figure 9:
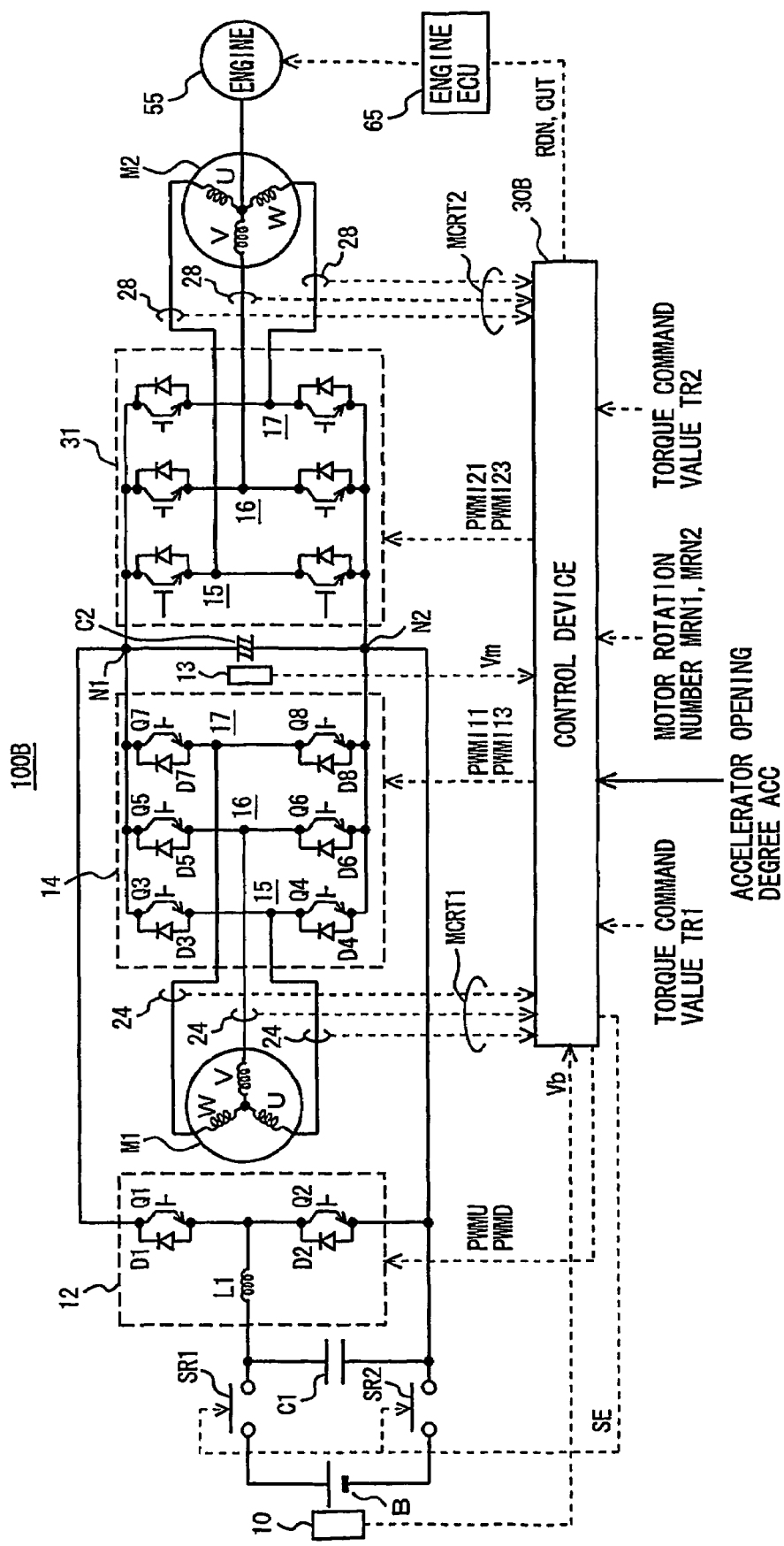
FIG. 9 is a schematic block diagram of a voltage converting device in accordance with a third embodiment.

Referring to FIG. 9, a voltage converting device 100B in accordance with a third embodiment is the same as voltage converting device 100A except that control device 30A, rectifier 18, generator G1, and current sensor 25 of voltage converting device 100A are replaced with a control device 30B, an inverter 31, an AC motor M2, and a current sensor 28, respectively.

It is noted that, in voltage converting device 100B, current sensor 24 detects and outputs motor current MCRT1 to control device 30B. AC motor M2 is connected to engine 55. Capacitor C2 receives the DC voltage from up-converter 12 via nodes N1, N2, smoothes the received DC voltage, and supplies the smoothed DC voltage to inverter 14 as well as to inverter 31. Inverter 14 converts, based on a signal PWMI11 from control device 30B, the DC voltage from capacitor C2 to an AC voltage for driving AC motor M1, and converts, based on a signal PMW13, the AC voltage generated by AC motor M1 into a DC voltage.

Inverter 31 has the same configuration as inverter 14. Inverter 31 converts, based on a signal PWMI21 from control device 30B, the DC voltage from capacitor C2 into an AC voltage for driving AC motor M2, and converts, based on a signal PWMI23, the AC voltage generated by AC motor M2 into a DC voltage. Current sensor 28 detects motor current MCRT2 flowing to each phase of AC motor M2 and outputs the detected motor current MCRT2 to control device 30B.

Control device 30B receives DC voltage Vb output by DC power supply B from voltage sensor 10, receives motor currents MCRT1, MCRT2 from current sensors 24, 28, respectively, receives output voltage Vm of up-converter 12 (that is, the input voltage to inverters 14, 31) from voltage sensor 13, and receives torque command values TR1, TR2, motor rotation numbers MRN1, MRN2 and accelerator opening degree ACC from external ECU. Control device 30B generates, based on DC voltage Vb, output voltage Vm, motor current MCRT1, torque command value TR1, and motor rotation number MRN1, signal PWMI11 for controlling the switching of NPN transistors Q3-Q8 of inverter 14, following the aforementioned method, when inverter 14 drives AC motor M1. Control device 30B then outputs the generated signal PWMI11 to inverter 14.

Control device 30B also generates, based on DC voltage Vb, output voltage Vm, motor current MCRT2, torque command value TR2, and motor rotation number MRN2, signal PWMI21 for controlling the switching of NPN transistors Q3-Q8 of inverter 31, following the aforementioned method, when inverter 31 drives AC motor M2. Control device 30B then outputs the generated signal PWMI21 to inverter 31.

Control device 30B further generates, based on DC voltage Vb, output voltage Vm, motor current MCRT1 (or MCRT2), torque command value TR1 (or TR2), and motor rotation number MRN1 (or MRN2), signal PWMU for controlling the switching of NPN transistors Q1, Q2 of up-converter 12, following the aforementioned method, when inverter 14 or 31 drives AC motor M1 or M2. Control device 30B then outputs the generated signal PWMU to up-converter 12.

Control device 30B also generates, in the regenerative braking mode, a signal PWM13 for converting the AC voltage generated by AC motor M1 into a DC voltage, or a signal PWM23 for converting the AC voltage generated by AC motor M2 into a DC voltage, and outputs the generated signal PWM13 or PWM23 to inverter 14 or inverter 31, respectively. In this case, control device 30B generates and outputs signal PWMD to up-converter 12 for controlling up-converter 12 such that up-converter 12 down-converts the DC voltage from inverter 14 or 31 to charge DC power supply B.

Furthermore, control device 30B determines whether or not up-converter 12 fails, following the aforementioned method. When up-converter 12 fails, control device 30B calculates energy Pm in AC motor M1 based on accelerator opening degree ACC and motor rotation number MRN1. Control device 30B then determines whether AC motor M1 is in a powering mode or a regenerative mode based on the calculated energy Pm. If AC motor M1 is in the powering mode, control device 30B regards the calculated energy Pm as an energy consumption Pm1. When AC motor M1 is in the powering mode, AC motor M2 is in the regenerative mode. Accordingly, control device 30B calculates a power generation amount Pg2 of AC motor M2 and controls power generation amount Pg2 of AC motor M2 to be equal to or less than energy consumption Pm1 of AC motor M1, following the method as described in the second embodiment.

When AC motor M1 is in the regenerative mode, control device 30B regards the calculated energy Pm as a power generation amount Pg1 and then generates and outputs a signal CUT to engine ECU 65 so that the fuel of engine 55 is cut off. In addition, control device 30B controls AC motor M2 such that it outputs positive torque. Control device 30B then calculates an energy consumption Pm2 of AC motor M2, and if a sum Pg1+Pm2 of power generation amount Pg1 and energy consumption Pm2 is negative, control device 30B controls AC motor M1 such that power generation amount Pg1 in AC motor M1 is equal to or less than energy consumption Pm2.

In addition, control device 30B generates and outputs signal SE to system relays SR1, SR2 for turning on/off system relays SR1, SR2.

Figure 10:
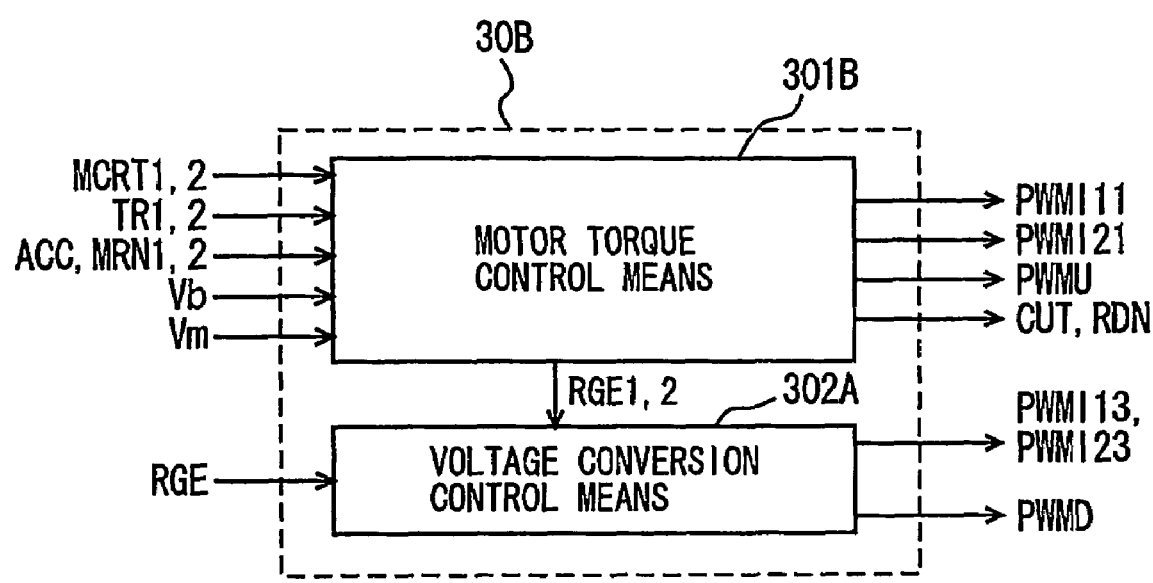
FIG. 10 is a functional block diagram of a control device shown in FIG. 9.

Referring to FIG. 10, control device 30B includes motor torque control means 301B and voltage conversion control means 302A. Motor torque control means 301B generates signal PVMI11 based on motor current MCRT1, torque command value TR1, motor rotation number MRN1, DC voltage Vb, and voltage Vm, and outputs the generated signal PWVMI11 to inverter 14. Motor torque control means 301B generates signal PWMI21 based on motor current MCRT2, torque command value TR2, motor rotation number MRN2, DC voltage Vb, and voltage Vm, and outputs the generated signal PWMI21 to inverter 31.

Motor torque control means 301B also generates signal PWMU based on DC voltage Vb, voltage Vm, motor current MCRT1 (or MCRT2), torque command value TR1 (or TR2), and motor rotation number MRN1 (or MRN2), and outputs the generated signal PWMU to up-converter 12.

Furthermore, motor torque control means 301B determines whether up-converter 12 fails, following the aforementioned method. If it is determined that up-converter 12 fails, motor torque control means 301B calculates energy Pm in AG motor M1 based on accelerator opening degree ACC and motor rotation number MRN1, and further determines whether AC motor M1 is in the powering mode or in the regenerative mode based on the calculated energy Pm. More specifically, motor torque control device 301B determines that AC motor M1 is in the powering mode when the calculated energy Pm is positive, and determines that AC motor M1 is in the regenerative mode when energy Pm is negative.

When AC motor M1 is in the powering mode, motor torque control means 301B calculates power generation amount Pg2 in AC motor M2 based on voltage Vm from voltage sensor 13 and motor current MCRT2 from current sensor 28. Motor torque control means 301B then generates signal RDN for setting the rotation number of engine 55 such that power generation amount Pg2 in AC motor M2 is equal to or less than energy consumption Pm1 and outputs the generated signal RDN to engine ECU 65. Motor torque control means 301B also generates signal RGE2 and outputs the generated signal RGE2 to voltage conversion control means 302A.

On the other hand, when AC motor M1 is in the regenerative mode, motor torque control means 301B generates and outputs signal CUT for cutting off the fuel for engine 55 to engine ECU 65, signal RGE1 to voltage conversion control means 302A, and signal PWMI21 for causing AC motor M2 to output positive torque to inverter 31. Motor torque control means 301B calculates energy consumption Pm2 in AC motor M2. If the sum of power generation amount Pg1 in AC motor M1 and energy consumption Pm2 in AC motor M2 is negative, motor torque control means 301B controls AC motor M1 such that power generation amount Pg1 in AC motor M1 is equal to or less than energy consumption Pm2 in AC motor M2. Motor torque control means 301B holds the present state of AC motors M1, M2, if the sum of power generation amount Pg1 and energy consumption Pm2 is positive.

Voltage conversion control means 302A receives from external ECU signal RGE indicating that the hybrid or electric vehicle including voltage converting device 100B enters the regenerative braking mode, to generate signals PWM13, 23 and signal PWMD, output the generated signals PWM 13, 23 to inverters 14, 31, respectively, and output signal PWMD to up-converter 12.

Voltage conversion control means 302A also receives signal RGE1 from motor torque control means 301B to generate and output signal PWMI13 to inverter 14 for controlling power generation amount Pg1 in AC motor M1 to be equal to or less than energy consumption Pm2 in AC motor M2.

Voltage conversion control means 302A also receives signal RGE2 from motor torque control means 301B to generate and output signal PWMI23 to inverter 31 for controlling power generation amount Pg2 in AC motor M2 to be equal to or less than energy consumption Pm1 in AC motor M1.

Figure 11:
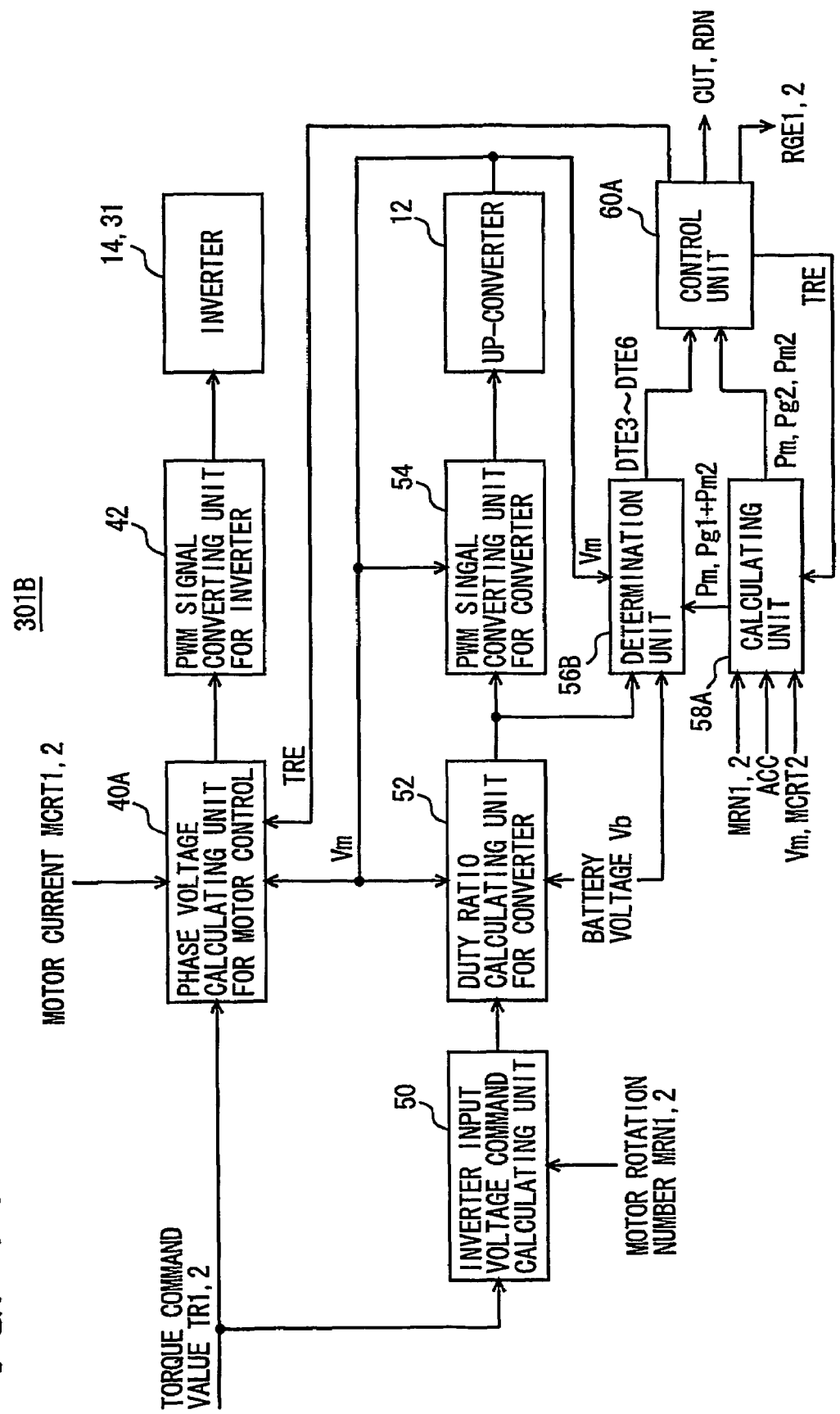
FIG. 11 is a functional block diagram illustrating a function of motor torque control means shown in FIG. 10.

Referring to FIG. 11, motor torque control means 301B is the same as motor torque control means 301A except that phase voltage calculating unit 40 for controlling the motor, determination unit 56A, calculating unit 58, and control unit 60 of motor torque control means 301A are replaced with a phase voltage calculating unit 40A for controlling the motor, a determination unit 56B, a calculating unit 58A, and a control unit 60A, respectively.

Phase voltage calculating unit 40A calculates a voltage to be applied to each phase of AC motor M1 based on output voltage Vm of up-converter 12, motor current MCRT1 and torque command value TR1, and calculates a voltage to be applied to each phase of AC motor M2 based on output voltage Vm, motor current MCRT2 and torque command value TR2. Phase voltage calculating unit 40A then outputs the voltage calculated for AC motor M1 or M2 to PWM signal converting unit 42.

Phase voltage calculating unit 40A receives torque command value TRE from control unit 60A to calculate a voltage to be applied to each phase of AC motor M2, based on torque command value TRE, output voltage Vm and motor current MCRT2, and then outputs the calculated voltage to PWM converting unit 42.

PWM signal converting unit 42 receives a voltage for AC motor M1 from phase voltage calculating unit 40A to generate and output signal PWMI11 to inverter 14 based on the received voltage. PWM signal converting unit 42 receives a voltage for AC motor M2 from phase voltage calculating unit 40A to generate and output signal PWMI21 to inverter 31 based on the received voltage.

Inverter input voltage command calculating unit 50 calculates voltage command Vdc_com based on torque command value TR1 and motor rotation number MRN1 (or torque command value TR2 and motor rotation number MRN2), and outputs the calculated voltage command Vdc_com to duty ratio calculating unit 52.

Determination unit 56B determines whether or not up-converter 12 fails, based on battery voltage Vb from voltage sensor 10, output voltage Vm from voltage sensor 13 and duty ratio DR from duty ratio calculating unit 52, following the aforementioned method. If it is determined that up-converter 12 fails, determination unit 56B then determines whether energy Pm from calculating unit 58A is positive or negative. If energy Pm is positive, determination unit 56B determines that AC motor M1 is in the powering mode, and regards energy Pm as energy consumption Pm1. On the other hand, if energy Pm is negative, determination unit 56B determines that AC motor M1 is in the regenerative mode, and regards energy Pm as power generation amount Pg1.

When AC motor M1 is in the powering mode, determination unit 56B generates and outputs a signal DTE3 to control unit 60A for indicating a determination result that power generation amount Pg2 in AC motor M2 should be controlled to be equal to or less than energy consumption Pm1 in AC motor M1.

When AC motor M1 is in the regenerative mode, determination unit 56B generates and outputs a signal DTE4 to control unit 60A for indicating a determination result that the fuel for engine 55 should be cut off.

After outputting signal DTE4 to control unit 60A, determination unit 56B receives from calculating unit 58A the sum Pg1+Pm2 of power generation amount Pg1 in AC motor M1 and energy consumption Pm2 in AC motor M2, and determines whether the received sum Pg1+Pm2 is positive or negative. If the sum Pg1+Pm2 is negative, determination unit 56B generates and outputs a signal DTE5 to control unit 60A for indicating a determination result that power generation amount Pg1 in AC motor M1 should be controlled to be equal to or less than energy consumption Pm2 in AC motor M2.

If the sum Pg1+Pm2 is positive, determination unit 56B generates and outputs a signal DTE6 to control unit 60A for indicating a determination result that the present state in AC motors M1, M2 should be held.

Calculating unit 58A calculates torque T output by AC motor M1 based on accelerator opening degree ACC from external ECU, calculates energy Pm in AC motor M1 based on the calculated torque T and motor rotation number MRN1 from external ECU, and outputs the calculated energy Pm to determination unit 56B and control unit 60A.

Calculating unit 58A calculates power generation amount Pg2 in AC motor M2 based on output voltage Vm from voltage sensor 13 and motor current MCRT2 from current sensor 28 and outputs the calculated power generation amount Pg2 to control unit 60A.

Furthermore, calculating unit 58A receives torque command value TRE from control unit 60A to calculate energy consumption Pm2 in AC motor M2 based on torque command value TRE and motor rotation number MRN2 from external ECU, and outputs the calculated energy consumption Pm2 to control unit 60A. Calculating unit 58A then calculates the sum of energy Pm in AC motor M1 and energy consumption Pm2 as the sum of power generation amount Pg1 in AC motor M1 and energy consumption Pm2, and outputs the calculated sum Pg1+Pm2 to determination unit 56B.

In response to signal DTE3 from determination unit 56B, control unit 60A regards energy Pm from calculating unit 58A as energy consumption Pm1 in AC motor M1 and compares power generation amount Pg2 from calculating unit 58A with energy consumption Pm1. Control unit 60A then generates and outputs signal RDN (including RDN1 and RDN2) to engine ECU65 for setting the rotation number of engine 55 such that power generation amount Pg2 is equal to or less than energy consumption Pm1. More specifically, if power generation amount Pg2 is equal to or less than energy consumption Pm1, control unit 60A generates and outputs signal RDN1 to engine ECU 65 for holding the present rotation number of engine 55. If power generation amount Pg2 is greater than energy consumption Pm1, control unit 60A generates and outputs signal RDN2 to engine ECU 65 for decreasing the present rotation number of engine 55 so that power generation amount Pg2 is equal to or less than energy consumption Pm1. Control unit 60A also generates and outputs signal RGE2 to voltage conversion control means 302A.

In response to signal DTE4 from determination unit 56B, control unit 60A generates signal CUT and torque command value TRE and outputs signal CUT to engine ECU-65 and torque command value TRE to phase voltage calculating unit 40A. Torque command value TRE is a command value for designating positive torque to be output by AC motor M2 so that the rotation number of engine 55 is maintained or increased.

In response to signal DTE5 from determination unit 56B, control unit 60A regards energy Pm from calculating unit 58A as power generation amount Pg1 in AC motor M1 and compares power generation amount Pg1 with energy consumption Pm2 from calculating unit 58A. Control unit 60A then generates and outputs signal RGE1 to voltage conversion control means 302A for limiting the regenerative amount from AC motor M1 so that power generation amount Pg1 is equal to or less than energy consumption Pm2.

In response to signal DTE6 from determination unit 56B, control unit 60A generates no control signal. Therefore, the present state in AC motors M1, M2 is held.

Figure 12:
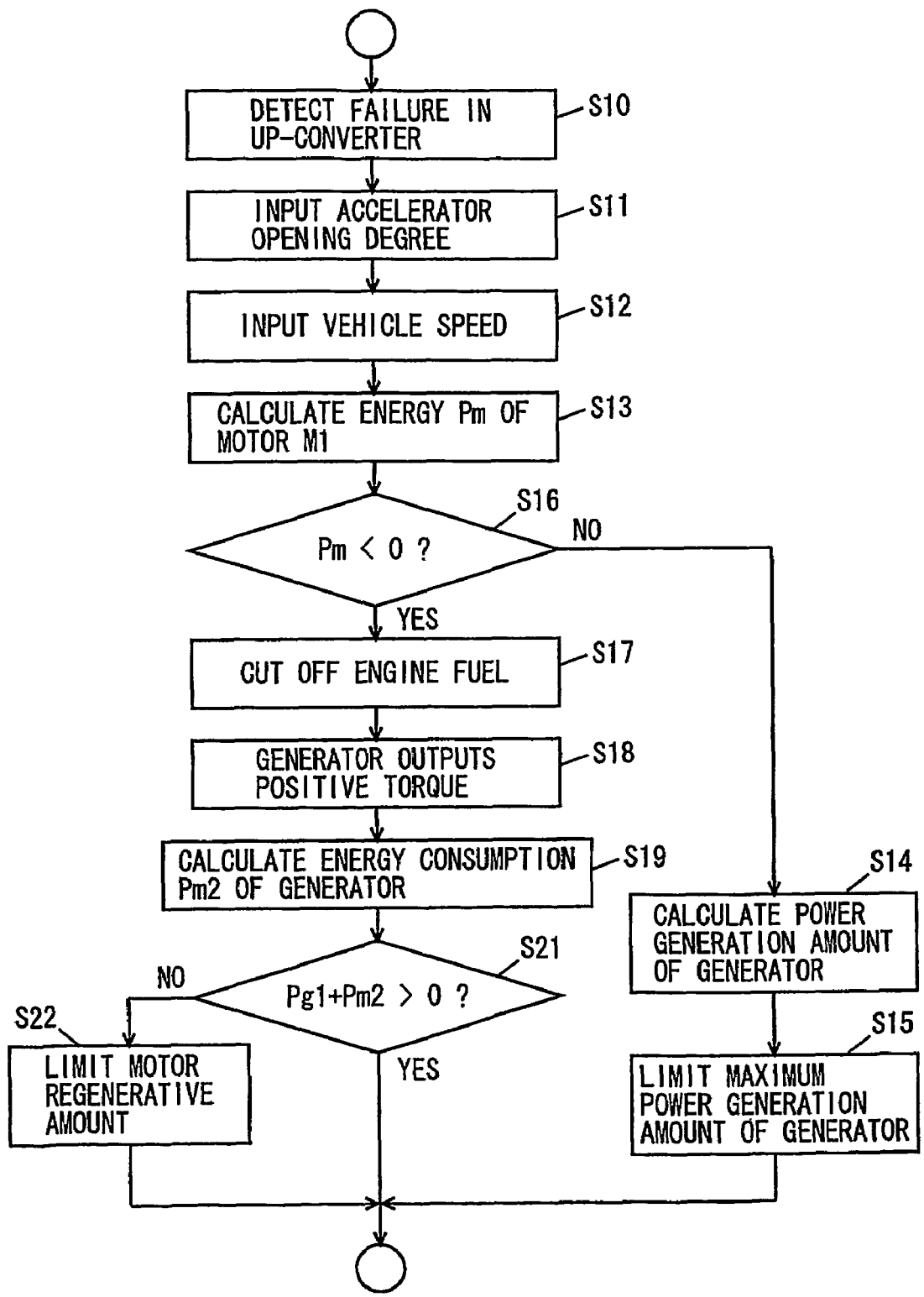
FIG. 12 is a flowchart illustrating an operation of processing a failure in an up-converter in the third embodiment.
Figure 13:
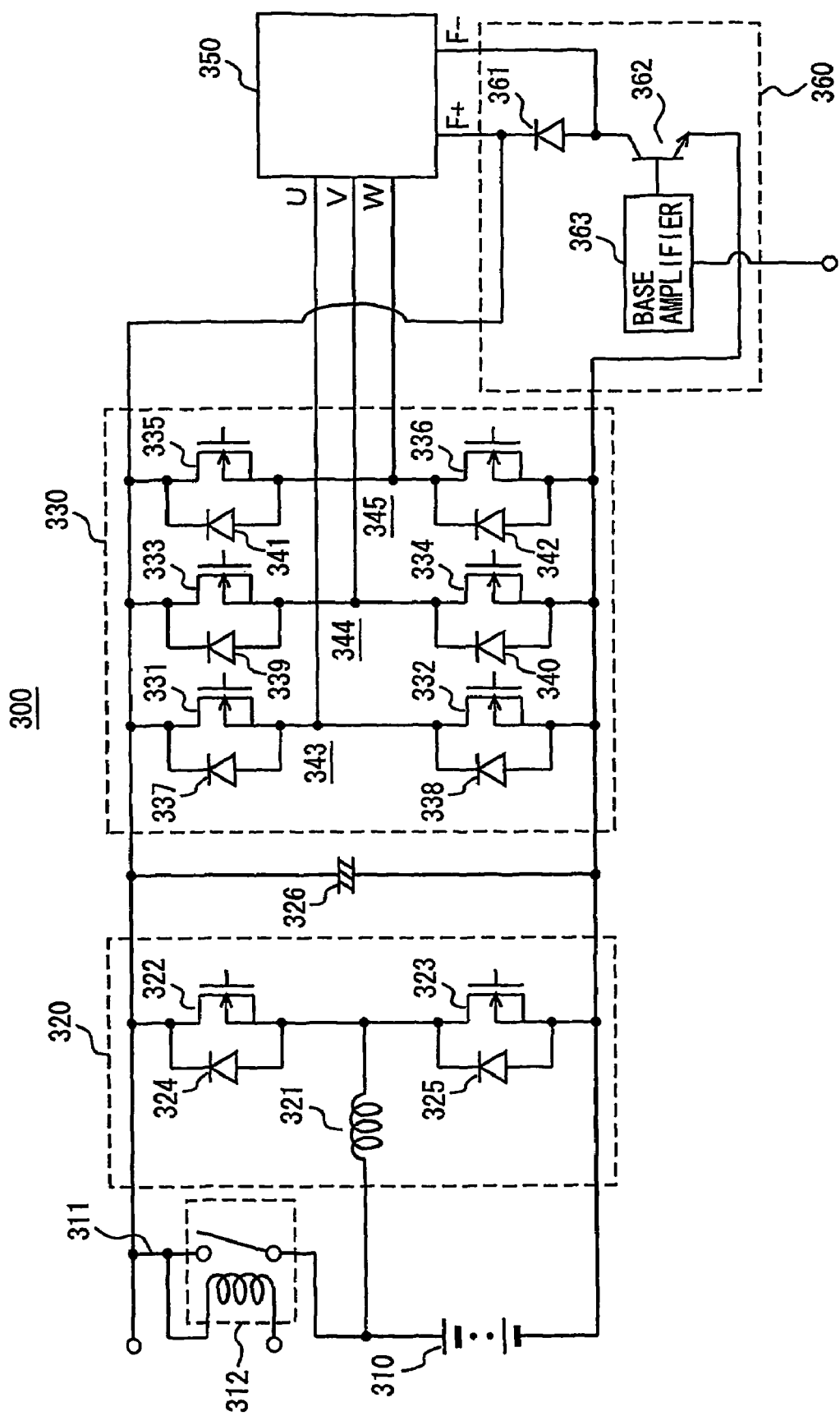
FIG. 13 is a schematic block diagram of a conventional electric device.

FIG. 12 is a flowchart illustrating an operation of processing a failure in up-converter 12 in the third embodiment. The flowchart shown in FIG. 12 is the same as the flowchart shown in FIG. 8 except that steps S16-19, S21 and S22 are added to the flowchart shown in FIG. 8. In the flowchart shown in FIG. 12, step S16 is inserted between steps S13 and S14, and steps S14, S15 are executed when a determination "No" is made at step S16.

Referring to FIG. 12, upon the start of a series of operations, steps S10-S13 are executed as described above. After step S13, determination unit 56B determines whether energy Pm received from calculating unit 58A is positive or negative (step S16). When it is determined that energy Pm is positive, determination unit 56B determines that AC motor M1 is in the powering mode. Then, steps S14, S15 as described above are executed so that power generation amount Pg2 in AC motor M2 is controlled to be equal to or less than energy consumption Pm1 in AC motor M1.

More specifically, determination unit 56B generates and outputs signal DTE3 to control unit 60A. In response to signal DTE3 from determination unit 56B, control unit 60A regards energy Pm from calculating unit 58A as energy consumption Pm1 in AC motor M1. Calculating unit 58A calculates power generation amount Pg2 in AC motor M2 based on voltage Vm from voltage sensor 13 and motor current MCRT2 from current sensor 28 (step S14) and outputs the calculated power generation amount Pg2 to control unit 60A. Control unit 60A compares power generation amount Pg2 from calculating unit 58A with energy consumption Pm1, generates signal RDN to be output to engine ECU 65 for setting the rotation number of engine 55 such that power generation amount Pg2 is equal to or less than energy consumption Pm1, and generates signal RGE2 to be output to voltage conversion control means 302A. In response to signal RDN from control unit 60A, engine ECU 65 sets the rotation number of engine 55 such that power generation amount Pg2 is equal to or less than energy consumption Pm1. AC motor M2 therefore generates electric power equal to or less than energy consumption Pm1. In response to signal RGE2 from control unit 60A, voltage conversion control means 302A generates and outputs signal PWMI23 to inverter 31. NPN transistors Q3-Q8 of inverter 31 are turned on/off in response to signal PWMI23 and convert the AC voltage generated by AC motor M2 to a DC voltage (step S15).

On the other hand, when it is determined that energy Pm is negative at step S16, determination unit 56B determines that AC motor M1 is in the regenerative mode and generates signal DTE4 to be output to control unit 60A. Then, in response to signal DTE4 from determination unit 56B, control unit 60A generates signal CUT to be output to engine ECU 65 and generates torque command value TRE to be output to phase voltage calculating unit 40A and calculating unit 58A.

Engine ECU 65 is responsive to signal CUT to cut off the fuel for engine 55 (step S17). Phase voltage calculating unit 40A calculates a voltage to be applied to each phase of AC motor M2 based on torque command value TRE from control unit 60A, output voltage Vm from voltage sensor 13 and motor current MCRT2 from current sensor 28 and outputs the calculated voltage to PWM signal converting unit 42. PWM signal converting unit 42 generates signal PWMI21 for actually turning on/off each of NPN transistors Q3-Q8 of inverter 31, based on the calculated voltage from phase voltage calculating unit 40A, and outputs the generated signal PWMI21 to each of NPN transistors Q3-Q8 of inverter 31. NPN transistors Q3-Q8 of inverter 31 are turned on/off in response to signal PWMI2 1, and inverter 31 drives AC motor M2 to output positive torque. AC motor M2 thereby outputs positive torque and rotates engine 55 at least at a prescribed rotation number (step S18).

Calculating unit 58A receives torque command value TRE from control unit 60A to calculate energy consumption Pm2 in AC motor M2 based on torque command value TRE and motor rotation number MRN2 from external ECU (step S19). In addition, calculating unit 58A calculates the sum of energy Pm calculated at step S13 and energy consumption Pm2 as the sum Pg1+Pm2 of power generation amount Pg1 in AC motor M1 and energy consumption Pm2, and outputs the calculated sum to determination unit 56B.

Then, determination unit 56B determines whether the sum Pg1+Pm2 is positive or negative (step S21). When it is determined that the sum Pg1+Pm2 is negative, determination unit 56B generates and outputs signal DTE5 to control unit 60A. In response to signal DTE5 from determination unit 56B, control unit 60A regards energy Pm from calculating unit 58A as power generation amount Pg1 in AC motor M1 and compares power generation amount Pg1 with energy consumption Pm2 from calculating unit 58A. Control unit 60A then generates and outputs signal RGE1 to voltage conversion control means 302A for limiting the regenerative amount from AC motor M1 so that power generation amount Pg1 is equal to or less than energy consumption Pm2.

In response to signal RGE1 from control unit 60A, voltage conversion control means 302A generates and outputs signal PWMI13 to inverter 14 for limiting power generation amount Pg1 to energy consumption Pm2 or less. NPN transistors Q3-Q8 of inverter 14 are turned on/off in response to signal PWMI13, and power generation amount Pg1 in AC motor M1 is limited to energy consumption Pm2 in AC motor M2 or less (step S22).

On the other hand, when it is determined that the sum Pg1+Pm2 is positive at step S21, determination unit 56B outputs signal DTE6 to control unit 60A. Control unit 60A then receives signal DTE6 from determination unit 56B to generate no control signal. AC motor M1 thereby produces power generation amount Pg1 equal to energy Pm calculated at step S13, and AC motor M2 consumes energy consumption Pm2 calculated at step S19. In other words, AC motors M1, M2 are held at the present state. A series of operations then ends.

At step S18 shown in FIG. 12, AC motor M2 is controlled such that it outputs positive torque, when AC motor M1 is in the regenerative mode. In this way, the third embodiment is characterized in that when AC motor M1 not connected to engine 55 is in the regenerative mode, AC motor M2 connected to engine 55 is controlled such that it outputs positive torque. In other words, the energy consumption in AC motor M2 is increased in order to prevent a voltage equal to or higher than the withstand voltage from being applied to capacitor C2.

Returning to FIG. 9, the entire operation in voltage converting device 100B will be described. Upon the start of the entire operation, control device 30B generates and outputs signal SE of H level to system relays SR1, SR2 to turn on system relays SR1, SR2. DC power supply B outputs a DC voltage to up-converter 12 via system relays SR1, SR2.

Voltage sensor 10 detects DC voltage Vb output from DC power supply B and outputs the detected DC voltage Vb to control device 30B. Voltage sensor 13 detects voltage Vm on both ends of capacitor C2 and outputs the detected voltage Vm to control device 30B. Current sensor 24 detects motor current MCRT1 flowing to AC motor M1 and outputs the detected current to control device 30B. Current sensor 28 detects motor current MCRT2 flowing to AC motor M2 and outputs the detected current to control device 30B. Control device 30B receives torque command values TR1, TR2 and motor rotation numbers MRN1, MNR2 from external ECU.

Control device 30B then generates signal PWMI11, based on DC voltage Vb, output voltage Vm, motor current MCRT1, torque command value TR1, and motor rotation number MRN1, following the aforementioned method, and outputs the generated signal PWMI11 to inverter 14. Control device 30B also generates signal PWMI21 based on DC voltage Vb, output voltage Vm, motor current MCRT2, torque command value TR2, and motor rotation number MRN2, following the aforementioned method, and outputs the generated signal PWMI21 to inverter 31.

In addition, when inverter 14 (or 31) drives AC motor M1 (or M2), control device 30B generates signal PWMU for controlling the switching of NPN transistors Q1, Q2 of up-converter 12, based on DC voltage Vb, output voltage Vm, motor current MCRT1 (or MCRT2), torque command value TR1 (or TR2), and motor rotation number MRN1 (or MRN2), and outputs the generated signal PWMU to up-converter 12.

Then, in response to signal PWMU, up-converter 12 up-converts DC voltage Vb from DC power supply B and supplies the up-converted DC voltage to capacitor C2 via nodes N1, N2. Inverter 14 then converts the DC voltage smoothed by capacitor C2 to an AC voltage, according to signal PWMI11 from control device 30B, for driving AC motor M1. Inverter 31 converts the DC voltage smoothed by capacitor C2 to an AC voltage, according to signal PWMI21 from control device 30B, for driving AC motor M2. Therefore, AC motor M1 generates torque as designated by torque command value TR1, and AC motor M2 generates torque as designated by torque command value TR2.

When the hybrid or electric vehicle including voltage converting device 100B is in the regenerative braking mode, control device 30B receives signal RGE from external ECU, and in response to the received signal RGE, generates signals PWM13, 23 to be output to inverters 14, 31, respectively, and generates signal PWMD to be output to up-converter 12.

Inverter 14 then converts the AC voltage generated by AC motor M1 to a DC voltage in response to signal PWM13 and supplies the converted DC voltage to up-converter 12 via capacitor C2. Inverter 31 converts the AC voltage generated by AC motor M2 to a DC voltage in response to signal PWM23 and supplies the converted DC voltage to up-converter 12 via capacitor C2. Then, up-converter 12 receives the DC voltage from capacitor C2 via nodes N1, N2, down-converts the received DC voltage according to signal PWMD, and supplies the down-converted DC voltage to DC power supply B. The electric power generated by AC motor M1 or M2 is thereby charged in DC power supply B.

Control device 30B detects a failure in up-converter 12 following the aforementioned method and determines whether AC motor M1 is in the powering mode or in the regenerative mode based on energy Pm in AC motor M1. If AC motor M1 is in the powering mode, control device 30B controls AC motor M2 such that power generation amount Pg2 in AC motor M2 is equal to or less than energy consumption Pm1 in AC motor M1. If AC motor M1 is in the regenerative mode, control device 30B controls AC motor M1 such that power generation amount Pg1 in AC motor M1 is equal to or less than energy consumption Pm2 in AC motor M2.

Therefore, a voltage equal to or higher than a withstand voltage is prevented from being applied to capacitor C2 even if up-converter 12 fails.

It is noted that the failure processing method in accordance with the present invention includes, according to the flowchart shown in FIG. 12, detecting a failure in up-converter 12 and controlling power generation amount Pg1 in AC motor M1 to be equal to or less than energy consumption Pm2 in AC motor M2 or controlling power generation amount Pg2 in AC motor M2 to be equal to or less than energy consumption Pm1 in AC motor M1.

The failure processing in motor torque control means 301B is actually controlled by CPU. CPU reads a program including the steps of the flowchart shown in FIG. 12 from ROM and executes the read program to control the failure processing for up-converter 12 according to the flowchart shown in FIG. 12. Therefore, ROM corresponds to a computer (CPU) readable recording medium with a program recorded thereon with the steps of the flowchart shown in FIG. 12.

AC motors M1, M2 form "electric loads (including first and second electric loads)".

Other details are the same as in the first embodiment.

In accordance with the third embodiment, the voltage converting device includes a control device that controls a power generation amount in one of two AC motors to be equal to or less than energy consumption in the other AC motor in the event of a failure in an up-converter, thereby preventing application of a voltage equal to or higher than a withstand voltage to a capacitor provided at an input of an inverter.

It is noted that the present invention is not limited to the disclosure in the embodiments above and is applicable to a variety of hybrid or electric vehicles. For example, a plurality of inverters and motors may be connected in parallel to capacitor C2 and each motor (or motor generator) may be driven independently. In this case, one motor may be used for driving a rear wheel and the other motor may be used for driving a front wheel. A hybrid vehicle using a planetary gear mechanism is known where one motor generator is connected to a sun gear of the planetary gear mechanism, an engine is connected to a carrier of the planetary gear mechanism, and the other motor generator is connected to a ring gear. The present invention is also applicable to such a hybrid vehicle.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The present invention is applied to a voltage converting device capable of processing a failure in an up-converter without improving withstand voltage performance of a capacitor placed at an input of an inverter. The present invention is also applied to a failure processing method capable of processing a failure in an up-converter without improving withstand voltage performance of a capacitor placed at an input of an inverter. The present invention is further applied to a computer readable recording medium with a program recorded thereon for causing a computer to execute failure processing for an up-converter without improving withstand voltage performance of a capacitor placed at an input of an inverter.

The invention claimed is:

1. A voltage converting device comprising:
an electric load having an electric power generating function;
a capacitor connected to an input of said electric load;
a down-converter down-converting a voltage of said capacitor;
first control means controlling an amount of electric power generated by said electric load; and
second control means outputting to said first control means a command for instructing prohibition of electric power generation in said electric load or for instructing decrease in an amount of electric power generated by said electric load, when said down-converter fails.

2. The voltage converting device according to claim 1, wherein said down-converter has a voltage-up-converting function.

3. The voltage converting device according to claim 2, wherein
said electric load is a motor having an electric power generating function,
said second control means outputs to said first control means a command for instructing restriction of a regenerative electric power generating function of said motor when said down-converter fails, and
said first control means restricts an amount of regenerative electric power generated by said motor based on said command.

4. The voltage converting device according to claim 1, wherein
said electric load is a motor having an electric power generating function,
said second control means outputs to said first control means a command for instructing restriction of a regenerative electric power generating function of said motor when said down-converter fails, and
said first control means restricts an amount of regenerative electric power generated by said motor based on said command.

5. The voltage converting device according to claim 4, wherein
said second control means outputs to said first control means a command for instructing prohibition of regenerative electric power generation of said motor, and
said first control means controls said amount of regenerative electric power generated by said motor to zero based on said command.

6. The voltage converting device according to claim 4, further comprising another electric load different from said motor, wherein
said second control means outputs to said first control means a command for instructing restriction of said amount of regenerative electric power generated by said motor to a value smaller than power consumption in said another electric load, and
said first control means restricts said amount of regenerative electric power generated by said motor based on said command.

7. A voltage converting device comprising:
a first electric load having an electric power generating function;
a capacitor connected to an input of said first electric load;
a down-converter down-converting a voltage of said capacitor;
a second electric load that operates by receiving electric power generated by said first electric load;
first control means controlling an amount of power consumption in said second electric load; and
second control means outputting to said first control means a command for instructing increase in an amount of power consumption in said second electric load, when said down-converter fails.

8. The voltage converting device according to claim 7, wherein
said second electric load is a motor,
said first control means further controls torque of said motor,
said second control means outputs to said first control means a command for instructing said motor to output positive torque, and
said first control means controls the torque of said motor to a positive value based on said command.

9. A computer device for causing a computer to execute failure processing in a voltage converting device,
said voltage converting device including
an electric load having an electric power generating function,
a capacitor connected to an input of said electric load, and
a down-converter down-converting a voltage of said capacitor,
wherein the computer device causes the computer to execute
a first step of generating a command for instructing prohibition of electric power generation in said electric load or for instructing decrease in an amount of electric power generated by said electric load, when said down-converter fails, and a second step of controlling an amount of electric power generated by said electric load based on the command generated in said first step.

10. The computer device according to claim 9, wherein
said electric load is a motor having an electric power generating function, and
in said first step, a command for instructing restriction of a regenerative electric power generating function of said motor is generated.

11. The computer device according to claim 10, wherein
in said first step, a command for instructing prohibition of regenerative electric power generation of said motor is generated.

12. The computer device according to claim 10, wherein
said voltage converting device further includes another electric load different from said electric load, and
in said first step, a command for instructing restriction of an amount of regenerative electric power generated by said motor to a value smaller than power consumption in said another electric load is generated.

13. A computer device for causing a computer to execute failure processing in a voltage converting device,
said voltage converting device including
a first electric load having an electric power generating function,
a capacitor connected to an input of said electric load,
a down-converter down-converting a voltage of said capacitor, and
a second electric load that operates by receiving electric power generated by said first electric load,
wherein the computer device causinn the computer to execute
a first step of generating a command for instructing increase in an amount of power consumption in said second electric load, when said down-converter fails, and
a second step of controlling an amount of power consumption in said second electric load, based on the command generated in said first step.

14. The computer device according to claim 13, wherein
said second electric load is a motor, and
in said first step, a command for instructing said motor to output positive torque is generated when said down-converter fails, and
in said second step, the torque of said motor is controlled to a positive value based on the command generated in said first step.

15. A failure processing method in a voltage converting device,
said voltage converting device including
an electric load having an electric power generating function,
a capacitor connected to an input of said electric load, and
a down-converter down-converting a voltage of said capacitor, said failure processing method comprising:
a first step of generating a command for instructing prohibition of electric power generation in said electric load or for instructing decrease in an amount of electric power generated by said electric load, when said down-converter fails; and
a second step of controlling an amount of electric power generated by said electric load based on the command generated in said first step.

16. The failure processing method according to claim 15, wherein
said electric load is a motor having an electric power generating function, and
in said first step, a command for instructing restriction of a regenerative electric power generating function of said motor is generated.

17. The failure processing method according to claim 16, wherein
in said first step, a command for instructing prohibition of regenerative electric power generation of said motor is generated.

18. The failure processing method according to claim 16, wherein
said voltage converting device further includes another electric load different from said electric load, and
in said first step of said failure processing method, a command for instructing restriction of an amount of regenerative electric power generated by said motor to a value smaller than power consumption in said another electric load is generated.

19. A failure processing method in a voltage converting device,
said voltage converting device including
a first electric load having an electric power generating function,
a capacitor connected to an input of said electric load,
a down-converter down-converting a voltage of said capacitor, and
a second electric load that operates by receiving electric power generated by said first electric load, wherein
said failure processing method comprises:
a first step of generating a command for instructing increase in an amount of power consumption in said second electric load, when said down-converter fails; and
a second step of controlling an amount of power consumption in said second electric load, based on the command generated in said first step.

20. The failure processing method according to claim 19, wherein
said second electric load is a motor, and
in said first step of said failure processing method, a command for instructing said motor to output positive torque is generated when said down-converter fails, and
in said second step, the torque of said motor is controlled to a positive value based on the command generated in said first step.

* * * * *